Feb. 15, 1955    H. G. CROUCHER    2,701,991
COMPOSING APPARATUS FOR REPRODUCING TYPOGRAPHICAL
AND LIKE MATTER BY PHOTOGRAPHIC MEANS
Filed July 16, 1951    16 Sheets-Sheet 1
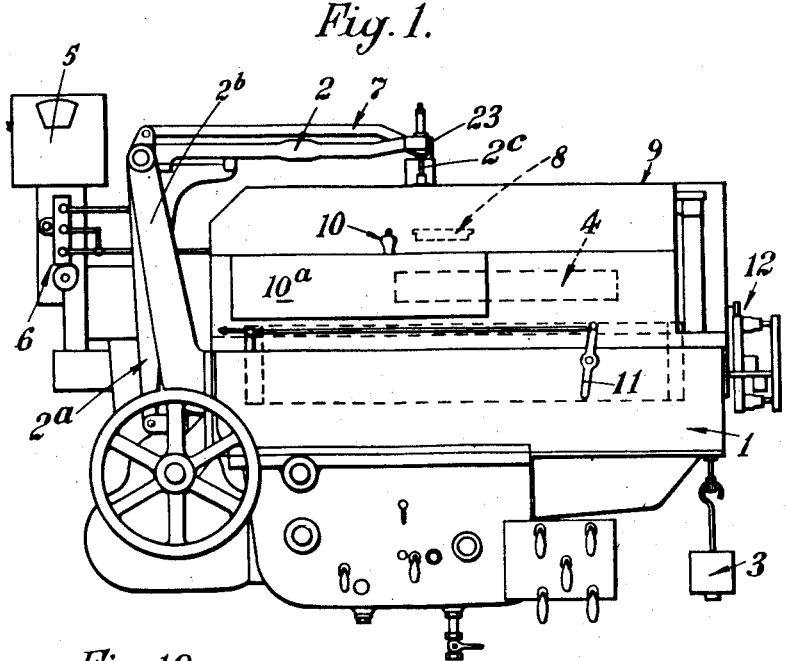
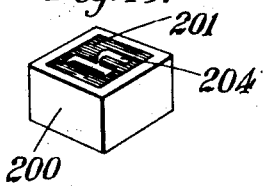
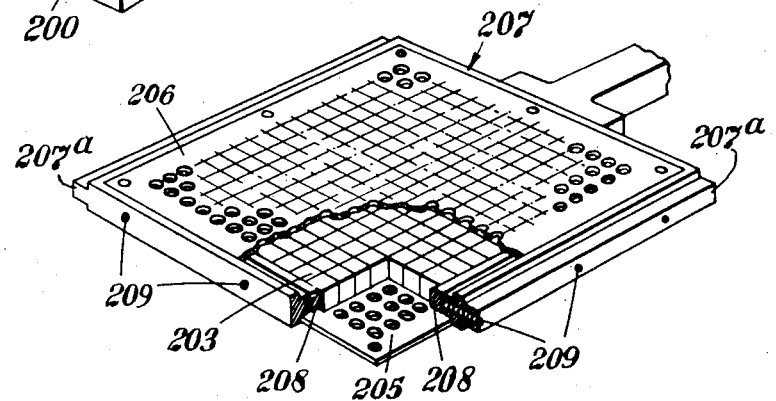
INVENTOR
Henry G. Croucher
BY
ATTORNEY

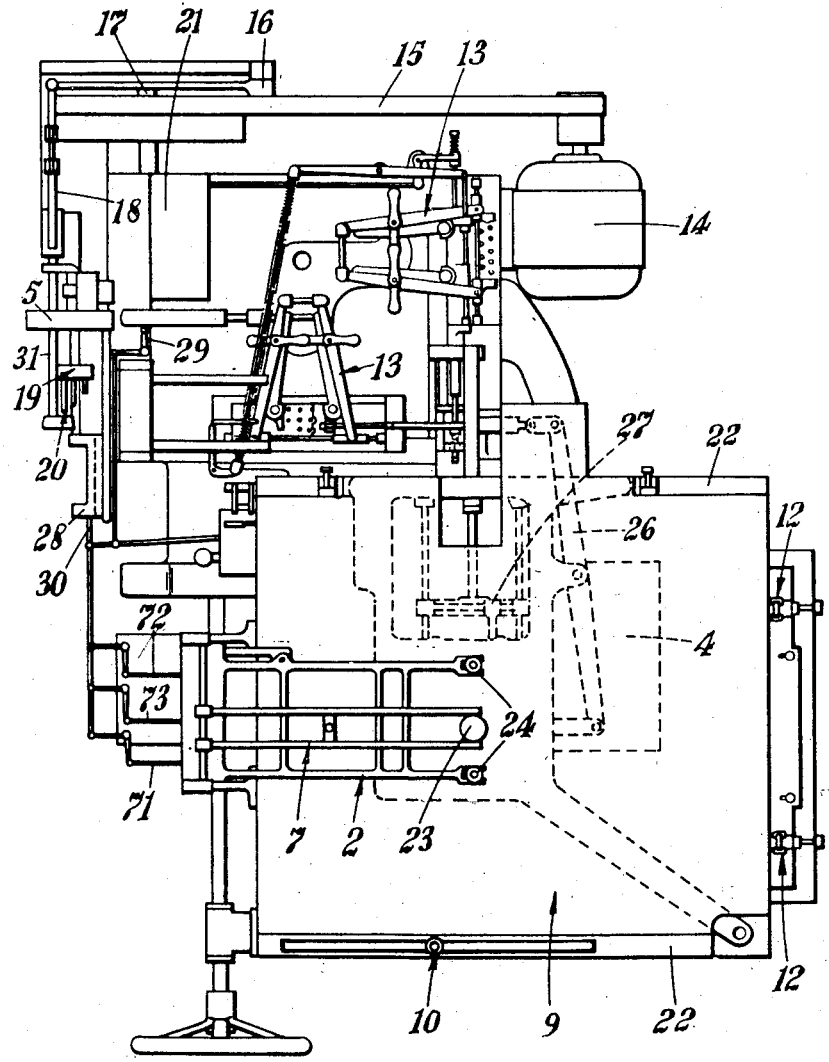

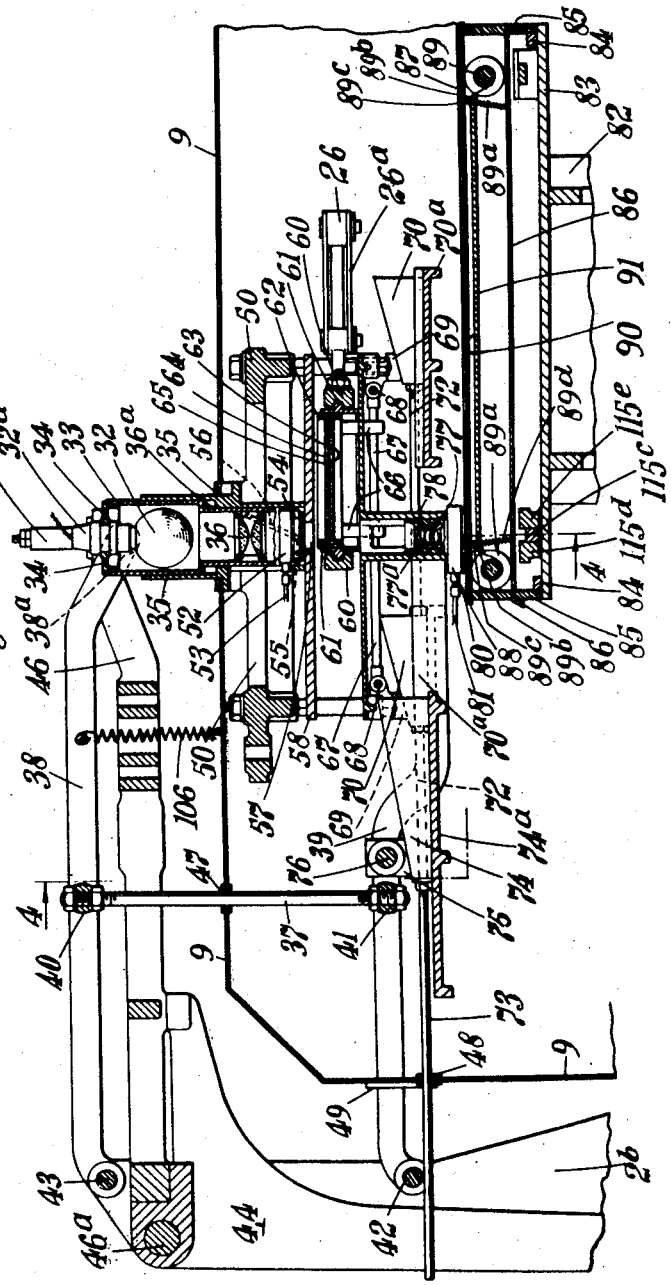

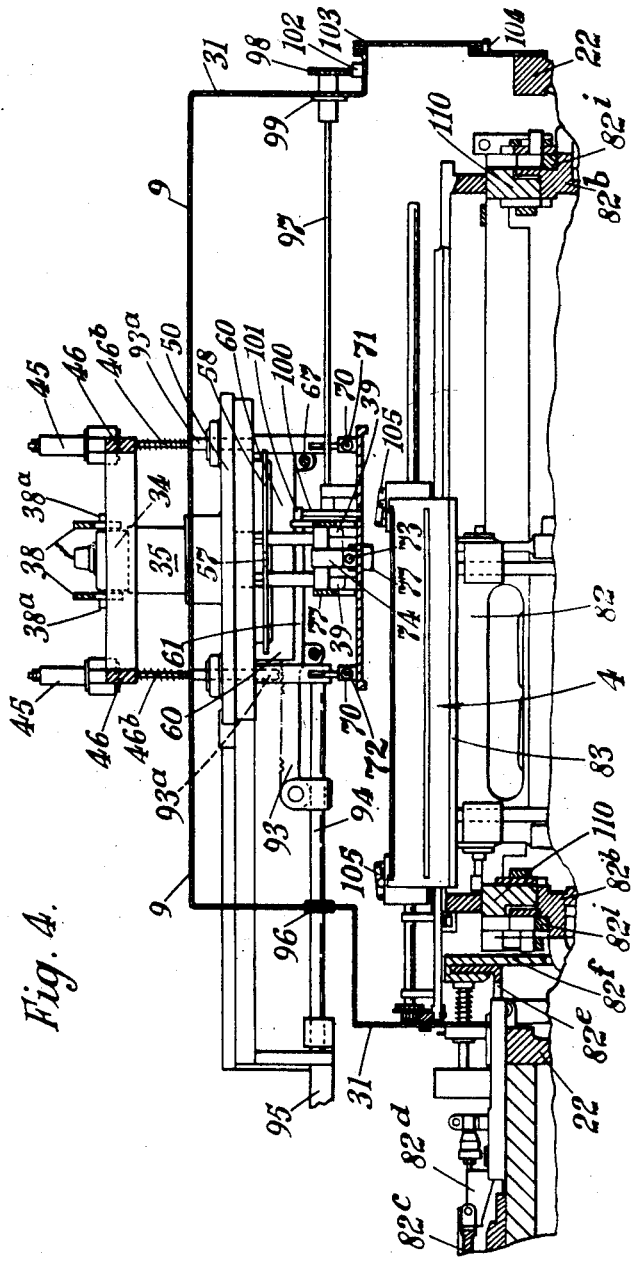

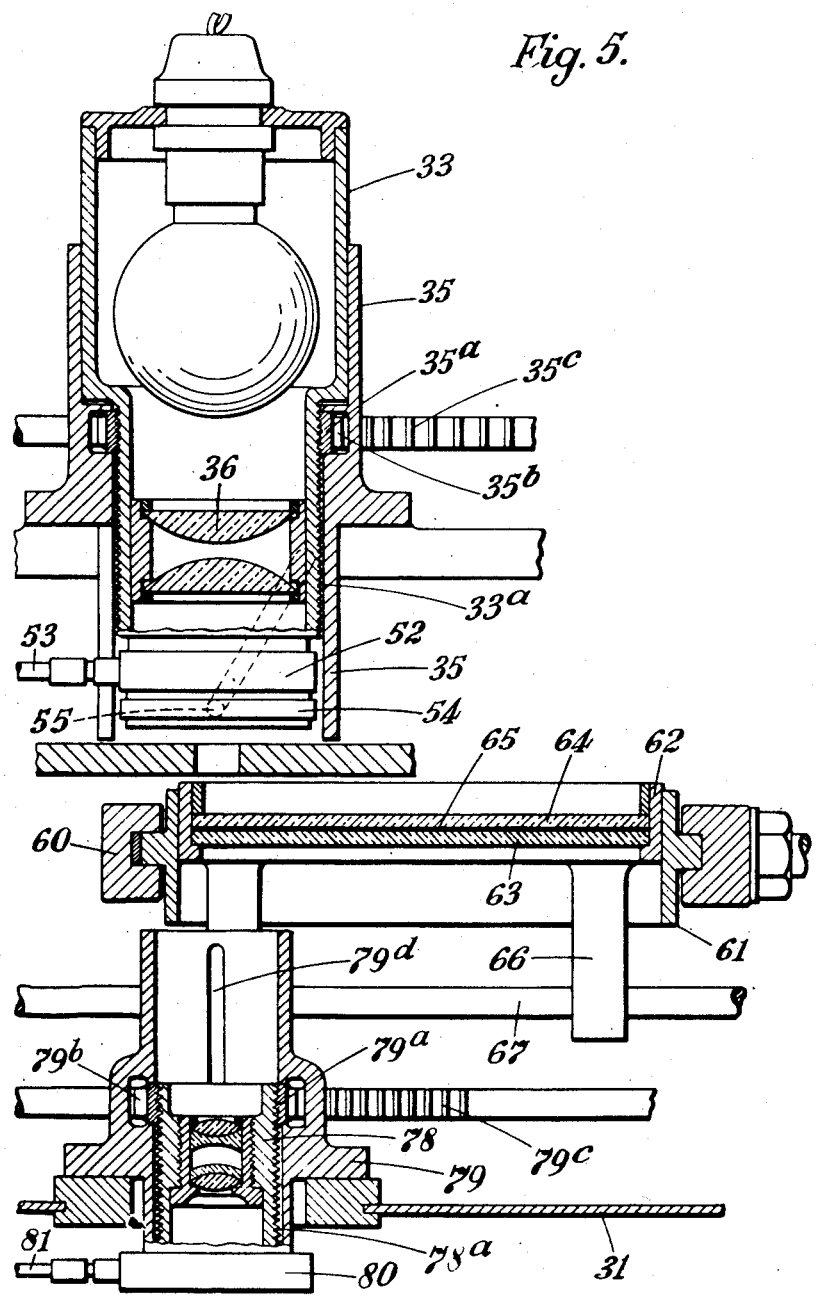

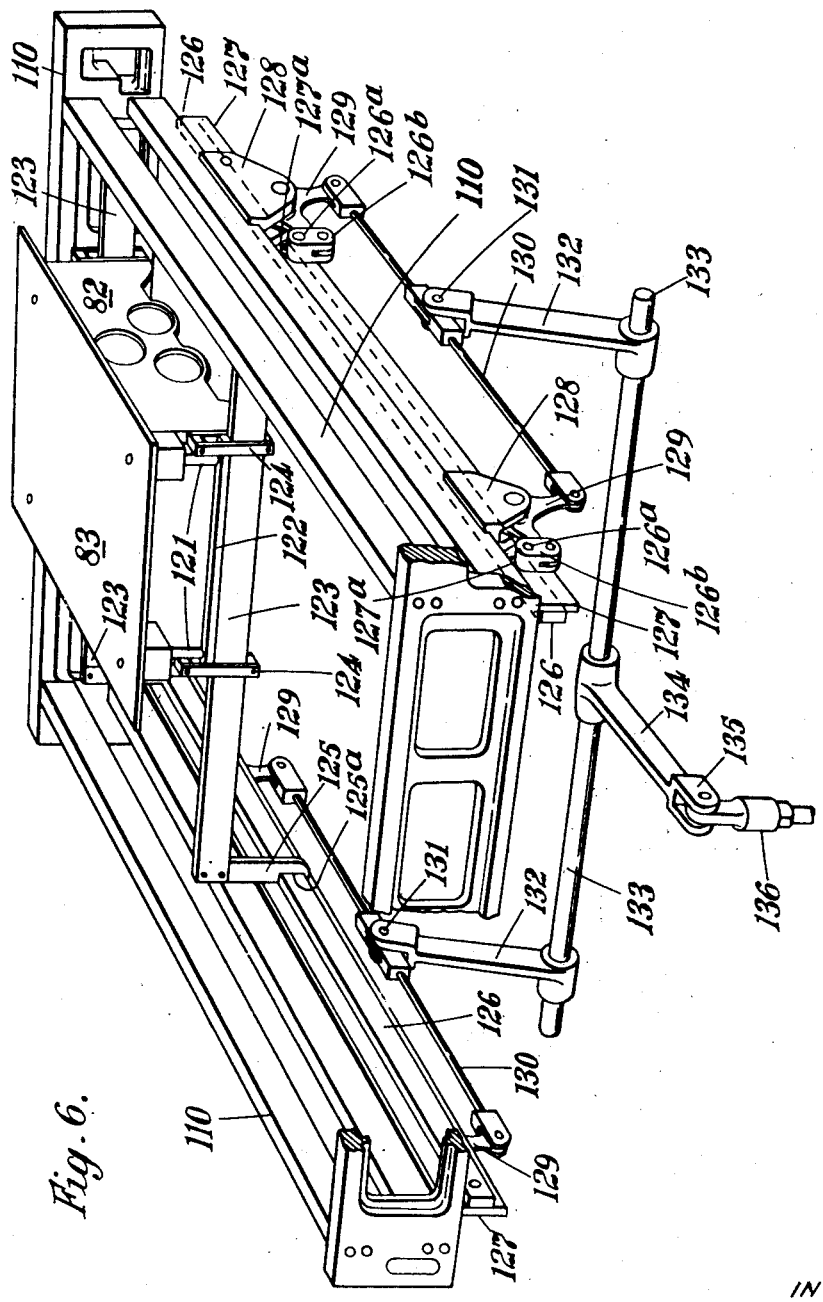

Feb. 15, 1955  H. G. CROUCHER  2,701,991
COMPOSING APPARATUS FOR REPRODUCING TYPOGRAPHICAL
AND LIKE MATTER BY PHOTOGRAPHIC MEANS
Filed July 16, 1951  16 Sheets-Sheet 7
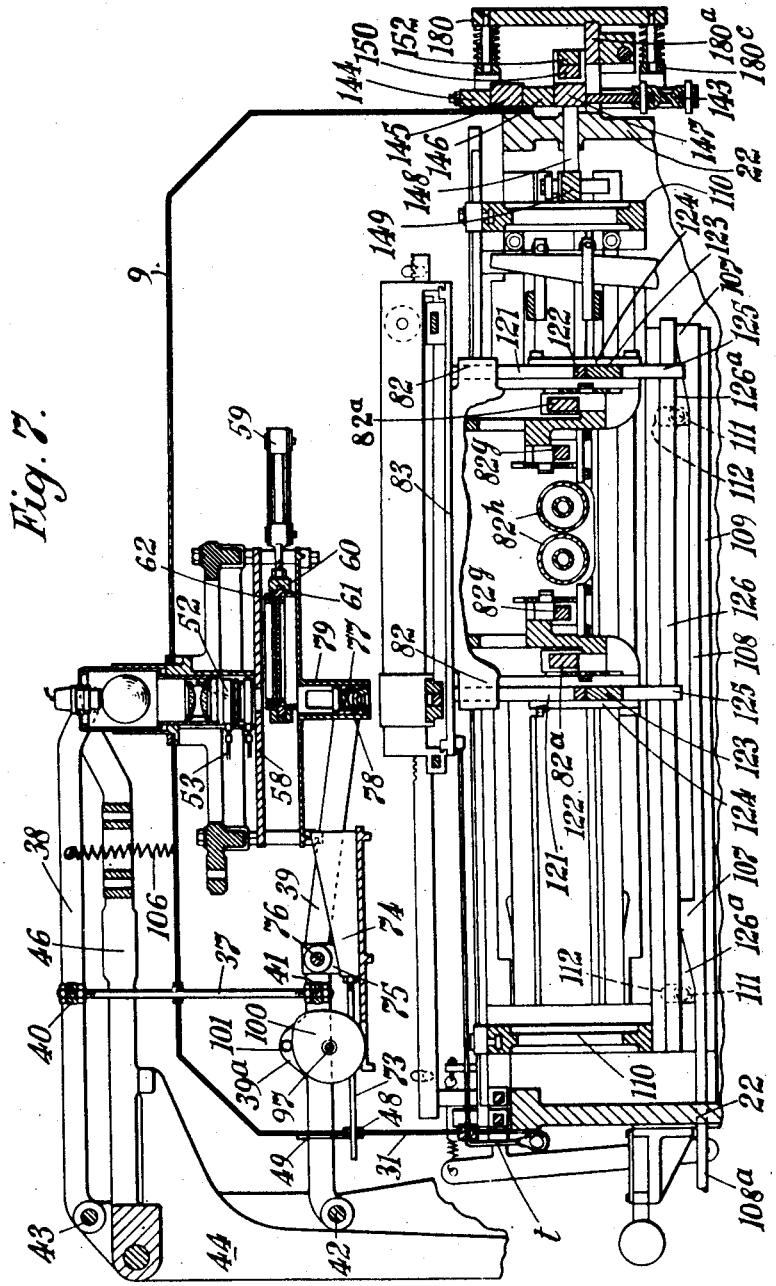
INVENTOR
Henry G. Croucher,
BY Hall & Houghton
ATTORNEY

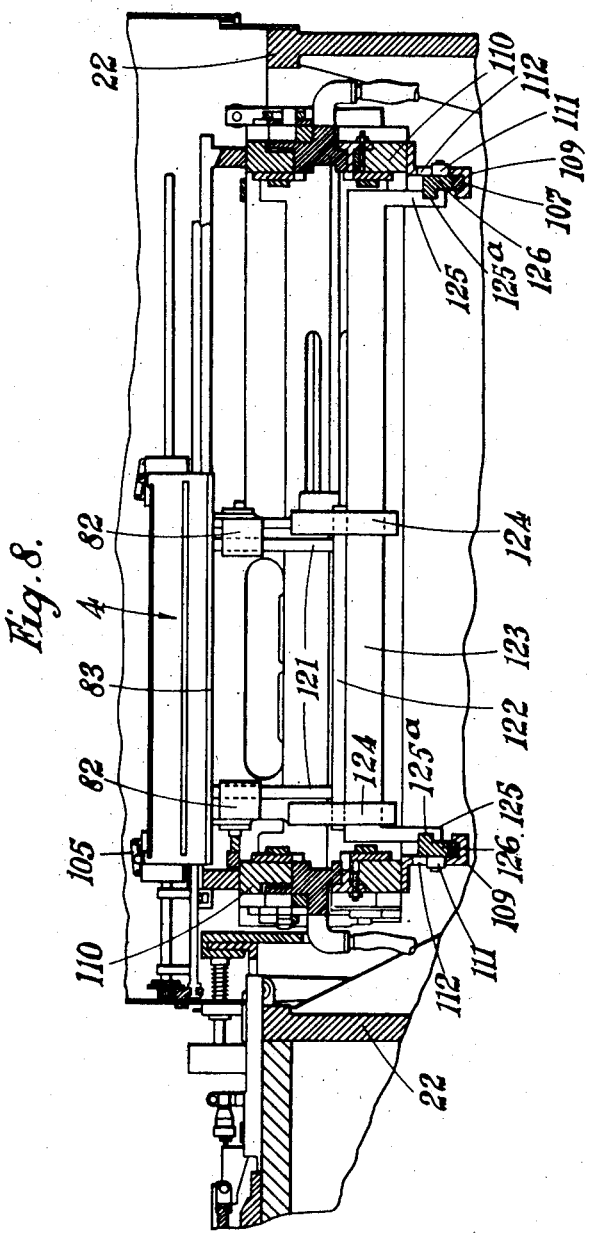

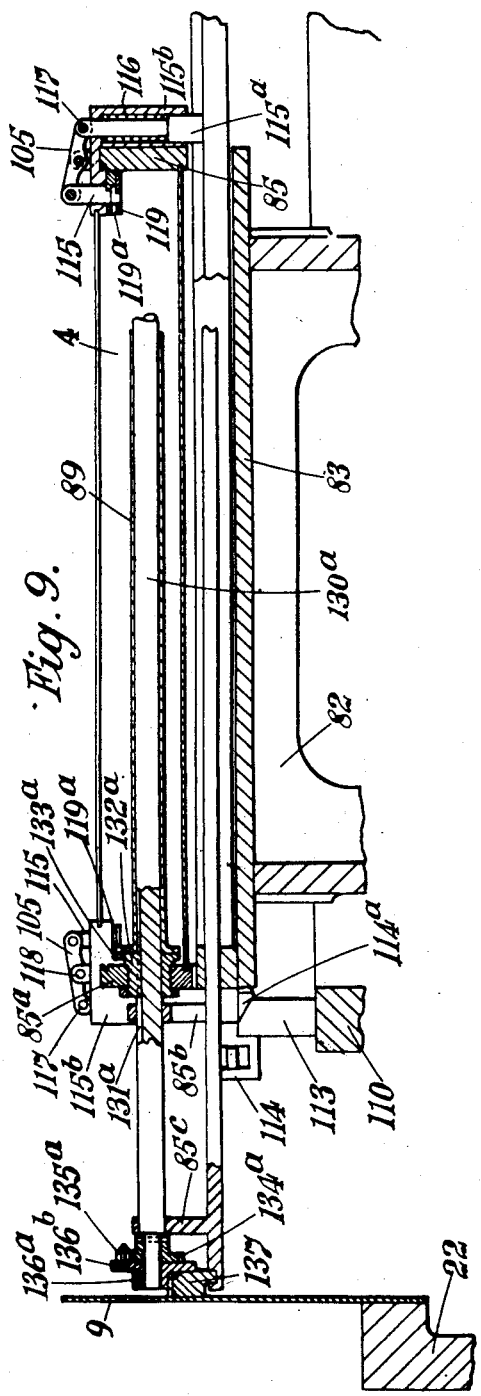

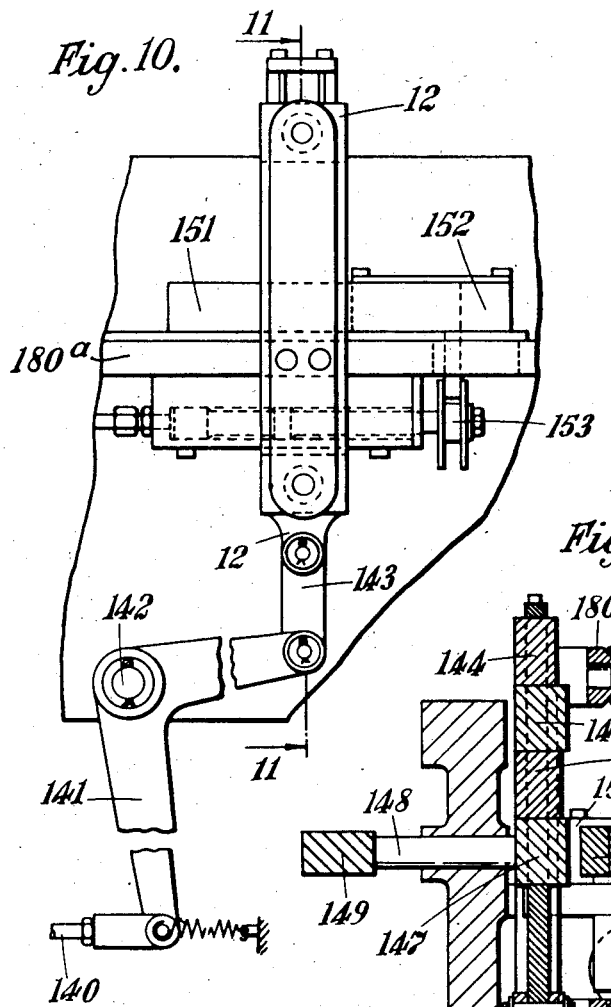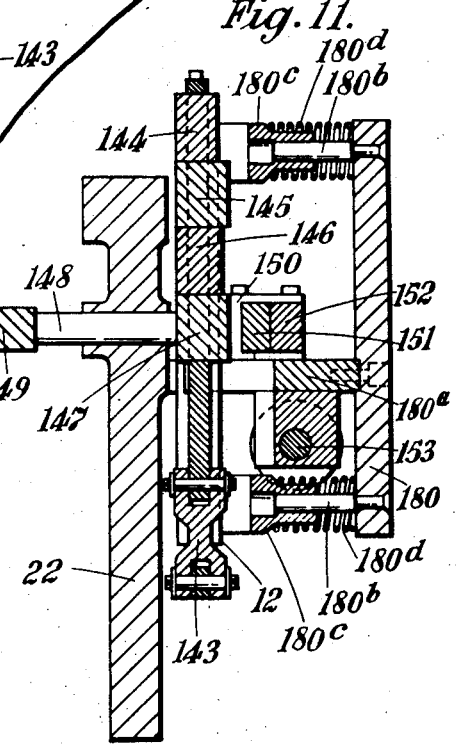

Feb. 15, 1955  H. G. CROUCHER  2,701,991
COMPOSING APPARATUS FOR REPRODUCING TYPOGRAPHICAL
AND LIKE MATTER BY PHOTOGRAPHIC MEANS
Filed July 16, 1951  16 Sheets-Sheet 11
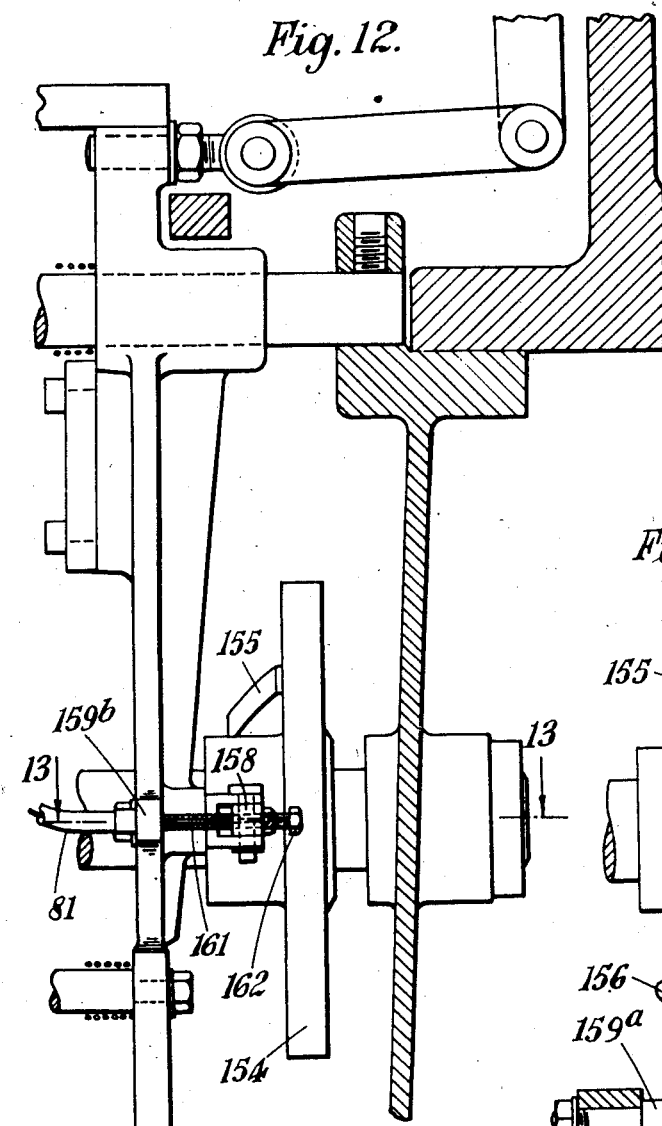
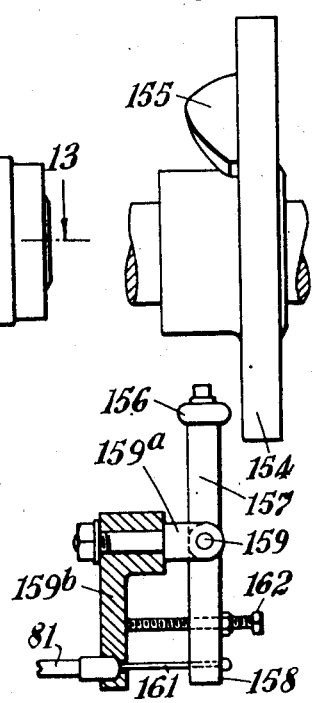
INVENTOR
Henry G. Croucher.
BY Hall & Houghton
ATTORNEY

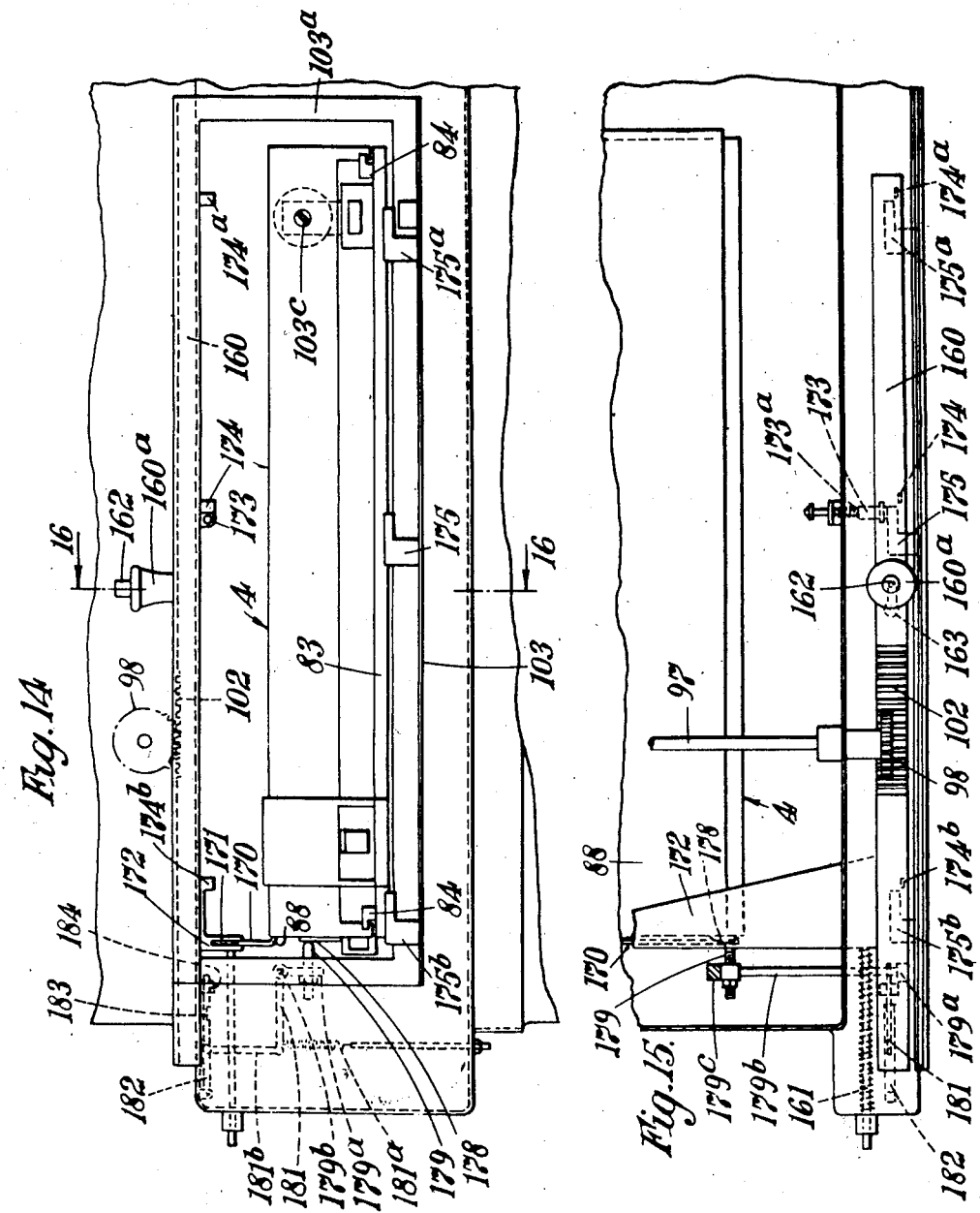

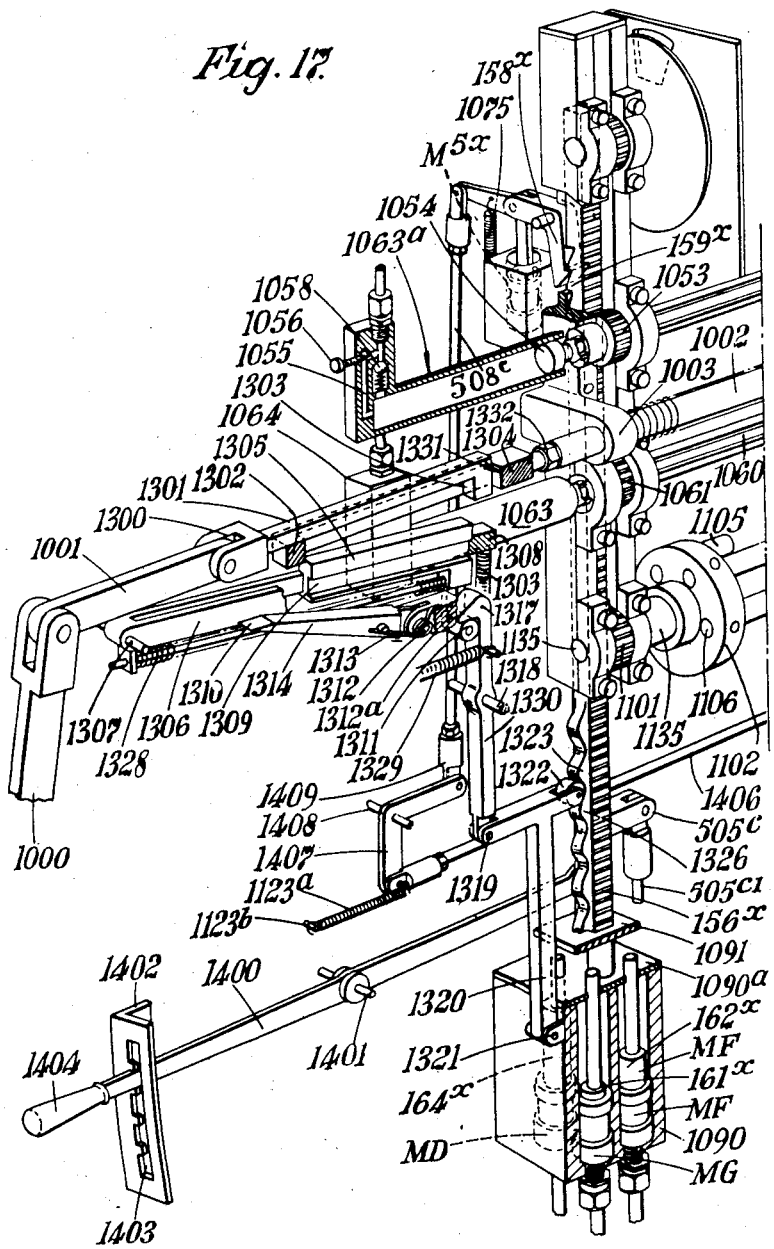

Feb. 15, 1955 H. G. CROUCHER 2,701,991
COMPOSING APPARATUS FOR REPRODUCING TYPOGRAPHICAL
AND LIKE MATTER BY PHOTOGRAPHIC MEANS
Filed July 16, 1951 16 Sheets-Sheet 15
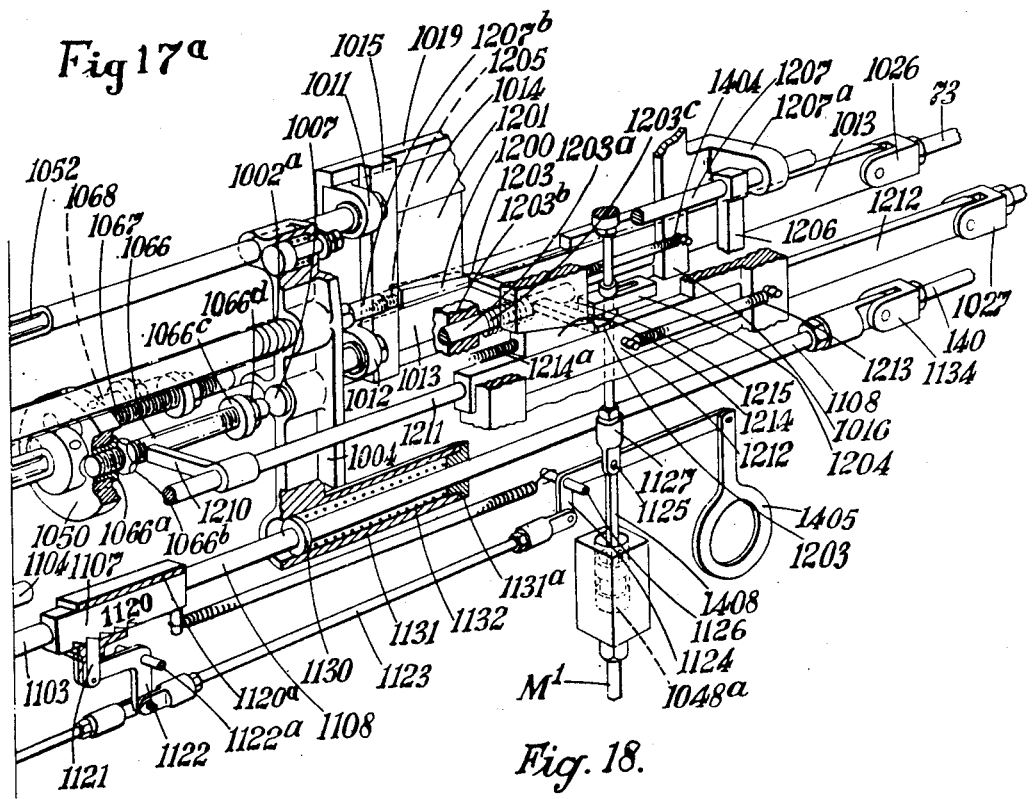
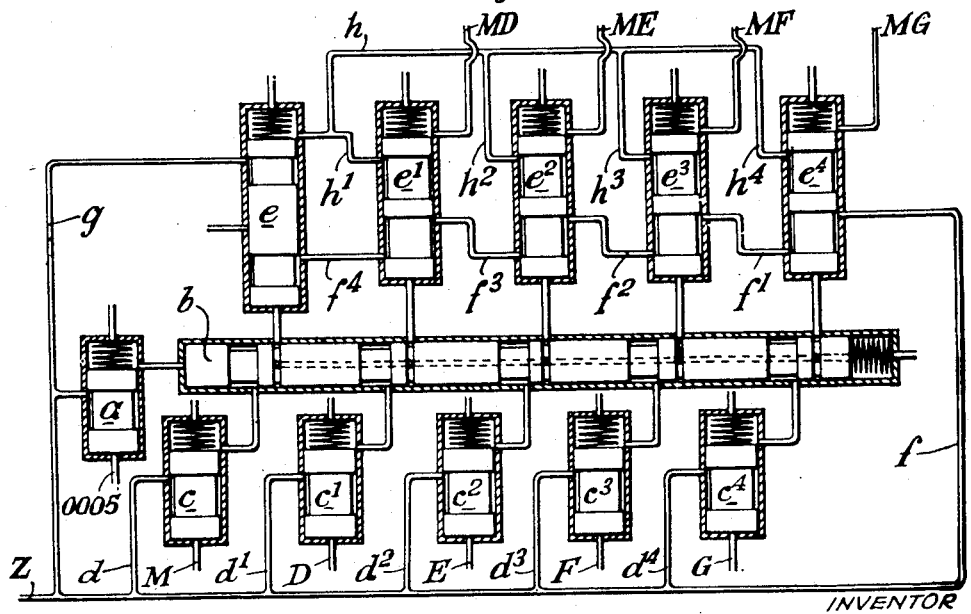
INVENTOR
Henry G. Croucher,
BY Hall · Houghton
ATTORNEY

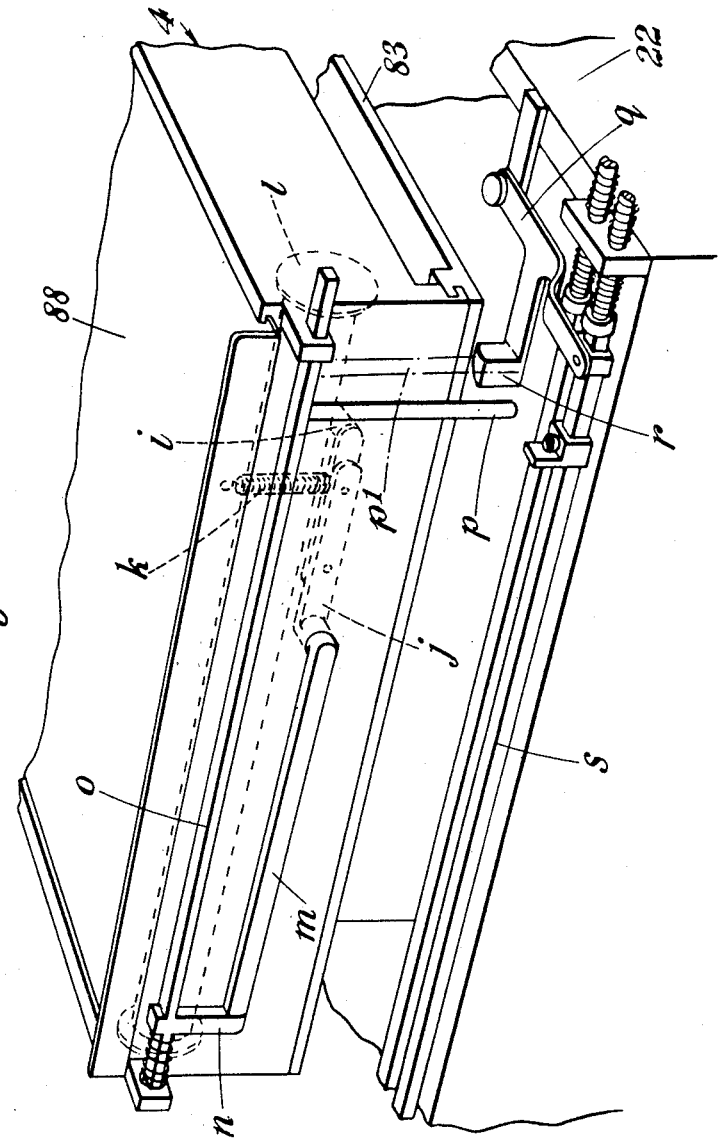

United States Patent Office 2,701,991
Patented Feb. 15, 1955

2,701,991
COMPOSING APPARATUS FOR REPRODUCING TYPOGRAPHICAL AND LIKE MATTER BY PHOTOGRAPHIC MEANS

Henry George Croucher, Beccles, England, assignor, by mesne assignments, to The Monotype Corporation Limited, London, England Application July 16, 1951, Serial No. 237,026

Claims priority, application Great Britain July 20, 1950

29 Claims. (Cl. 95—4.5)

This invention relates to composing apparatus for photographically reproducing typographical and like matter of the kind comprising a light system arranged to project images of the characters to be reproduced upon a light sensitive surface of any suitable kind, and the object of the invention is to provide improved apparatus which is capable of being readily adapted to a wide variety of typographical work. A further object is to provide an improved apparatus in which the light projection system is protected from wear and tear and is not subject to vibration during operation. A further object is to provide an improved apparatus in which the receiving surface can be of any desired size within reasonable limits and which is capable of reproducing characters in page form of the final size required without subsequent enlargement. A further object is to provide an apparatus in which both the form and size of the characters, and also the length and spacing of the lines can be readily varied in a simple and convenient manner. A further object is to provide means whereby pages of reproduced typographical and like matter of two or more reading sizes or a series thereof can be produced automatically without any necessity for machine stopping, or break in projection continuity.

The invention comprises an element or a plurality of elements bearing characters the images of which are capable of being projected upon a light sensitive surface by a suitable light system, and means for effecting relative movement between the said character bearing element or elements, the receiving surface, and the light system such that images of selected individual characters can be projected directly upon the light sensitive surface for reproduction thereby in the form of spaced lines or patterns, of two or more sizes of image automatically.

The invention also comprises an element or a plurality of elements bearing characters the images of which are capable of being projected upon a light sensitive surface by a suitable light system, means for effecting relative movement between the said character bearing element or elements, the receiving surface, and the light system such that images of selected individual characters can be reproduced in a line or in spaced lines or patterns upon the receiving surface, and means for varying the relative distances between the light system, the plane of the object or character to be reproduced, and the plane of the receiving surface in such proportion that the size of the reproduced characters in relation to the size of the object characters can be automatically varied to enable different type or character sizes to be reproduced.

The invention also comprises an arrangement according to either of the preceding paragraphs including means for automatically determining the proportional distances between the light system, the plane of the object or character to be reproduced, and the plane of the receiving surface to enable the type size of the reproduced characters to be varied as desired.

According to a further feature of the invention, the character bearing element or elements are carried by a support which is movable in the plane of the characters or elements to bring a selected character or element into a predetermined position for illumination by the light source which is not movable parallel to said plane, and the light sensitive surface is carried by a supporting means or table which is movable in a parallel plane to bring a desired point on said surface opposite said predetermined position so that the reproduced characters are arranged in spaced lines or other desired patterns.

In a preferred arrangement according to the invention, the supporting means or table referred to in the previous paragraph is arranged and actuated in the same manner as the supporting means or table described in the specification of patent application No. 148,132 now Patent No. 2,639,017. Thus the movements of the character bearing element support and the light sensitive surface support or table can be effected by pneumatically actuated means controlled from a perforated strip previously prepared on a known keyboard composing machine, such means being employed in known single-letter type casting machines or by mechanism as described in the specification of patent application No. 229,341.

The means whereby the required distances between the light system, the plane of the object or character, and the plane of the receiving surface are variable may be operable manually, but in accordance with a further feature of the invention such variation is effected automatically by the apparatus in accordance with previously settable control means or under the control of a previously prepared record-bearing means such as a perforated strip for example in conjunction with suitable pneumatic or other mechanism.

According to a further feature of the invention, the characters which constitute the objects for image reproduction are constituted by or provided as separate elements which are held within a case or frame so that they can be removed and replaced by other elements as desired. Such elements may comprise transparent blocks for example, or glass plates or blocks each mounted in a metal frame. The required character may be reproduced upon the block or plate with a dark background by any suitable method, and the casing or frame for holding the elements is provided with means whereby the said elements are accurately positioned therein and lie in a common plane.

The proportional distances between the light source, the object plane, and the image plane may be varied in any convenient manner, but in a preferred arrangement the light source is not movable parallel to the plane of the chracters or character bearing elements and is adjustable in a fixed housing or mounting in such a manner that it is not liable to be subject to vibration.

The period of illumination of the light sensitive surface may be conveniently controlled by a shutter. In a preferred arrangement the said shutter is located below the focussing lens and a second shutter or like means for cutting off the light is provided below the light system and is operated to prevent continuous illumination of the character bearing element or elements.

According to a further feature of the invention, a variable aperture is included in the light path and means is provided for varying the size of the aperture in accordance with the variations of image size to afford approximately uniform intensity of illumination of the image.

According to a further feature of the invention, the light sensitive surface is enclosed within a light excluding box which is secured in any convenient manner to a movable table or like supporting means, the box having a movable or sliding lid which is opened for the projection of the light beam on the said light sensitive surface. The light sensitive surface can be of any convenient form, such as roll film. The table or other movable support is provided with a suitable light enclosing cover having a door or the like to permit insertion of the aforesaid box. Means is preferably provided for ensuring that the lid or cover of the said light excluding box can only be opened for projection purposes when the door has been closed and locked, and for preventing unlocking of the door until the said lid or cover has been closed. The lid or cover of the light excluding box may be arranged so that it is opened progressively as the table or like supporting means travels in the direction of line length.

According to a further feature of the invention, the image receiving surface is supported by a table capable of controlled displacements in both line length and line depth directions, and variable means is provided for controlling successive movements of the table in line depth direction. Such adjustment may be effected by automatic means under the control of the previously prepared record strip or perforated strip means.

According to a further feature of the invention, adjustment of the focussing lens system is effected in co-ordination with the adjustment of either the image plane or the object plane by a single mechanism including a plurality of settable members arranged to determine the travel of controlling elements in accordance with the selected size of the character to be reproduced.

Other features of the invention will be referred to in the following description or in the claims.

It will be understood that variation in the width or spacing of the reproduced characters in their lines can be effected by the existing wedge sizing mechanism in a composing machine such as that known under the registered trade-mark Monotype when used in conjunction with apparatus having the features described in the specification of patent application No. 148,132 as modified for photographic projection in accordance with the present invention. Alternatively, the variation of character width or spacing may be controlled automatically by means as described in the specification of patent application No. 230,642 now Patent No. 2,650,697. By such means, the variation in size of the reproduced character can be obtained simultaneously with the variation in the travel of the table in the direction of character width. Also, the apparatus of the present invention can be employed in conjunction with the means for controlling the making up of a page of typographical or like matter as described in the specification of patent application No. 229,342, now Patent No. 2,672,973.

In the accompanying drawings,

Figure 1 is a side elevation of a typographical composing apparatus constructed and arranged in accordance with the invention;

Figure 2 is a plan view of the apparatus;

Figure 3 is a sectional side elevation of a part of the apparatus shown in Figure 1, showing the mechanism for actuating the light source and lens systems;

Figure 4 is a sectional end elevation of the mechanism shown in Figure 3;

Figure 5 is a view similar to Figure 3 showing an alternative form of mechanism for actuating the light source and lens systems;

Figure 6 is a perspective view showing a form of mechanism for effecting the rise and fall of the table supporting the image plane or light receiving surface;

Figure 7 is a view similar to Figure 3 showing another form of mechanism for actuating the table supporting the image plane or light receiving surface;

Figure 8 is a sectional end view of the mechanism shown in Figure 7;

Figure 9 is a sectional end elevation of a photographic film enclosure box supported on a table and showing film perforating mechanism;

Figure 10 is an elevation of a mechanism for controlling the travel of the table in line depth direction;

Figure 11 is a section taken on the line 11—11 of Figure 10;

Figure 12 is a side elevation of mechanism for actuating the shutter for controlling the light source;

Figure 13 is a section taken on the line 13—13 of Figure 12;

Figure 14 is a front elevation of the table enclosing cover showing the door open and the film enclosure box in position;

Figure 15 is a sectional view of a part of the enclosing cover shown in Figure 14, showing the door closed but unlocked;

Figures 17 and 17a are perspective views of mechanism for controlling the typographical composing apparatus both automatically and by manual means;

Figure 18 is a diagram of a valve chest for controlling the mechanism of Figure 17;

Figure 19 is a perspective view of a character-bearing element;

Figure 20 is a perspective view of a case, partly broken away, for containing a plurality of character-bearing elements;

Figure 21 is a perspective view of mechanism for effecting the stopping of the apparatus when the photographic film is exhausted.

Figure 16:
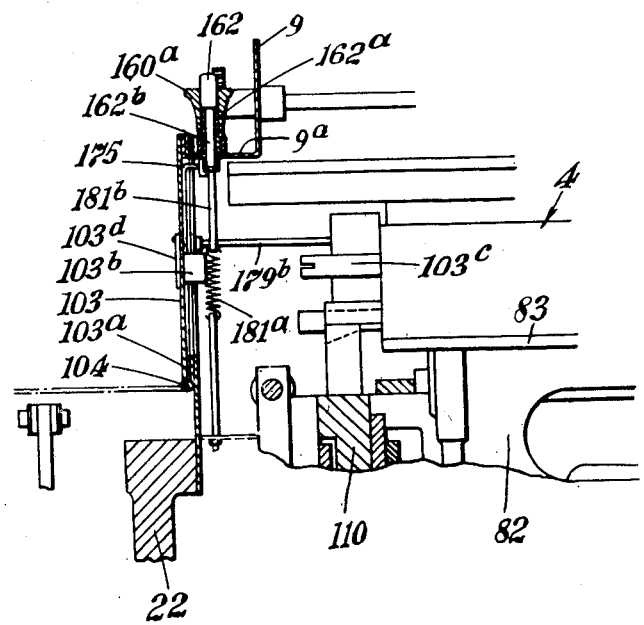
Figure 16 is a section taken on the line 16—16 of Figure 14.

In carrying the invention into effect according to one convenient mode, an apparatus is employed which is similar as regards the majority of its mechanical features to that described in the specification of patent application No. 148,132, the main differences being that the die case and die ejecting plunger are replaced by a frame and case carrying the character-bearing element or elements constituting the object, and a suitable light system, and the table is provided with means for containing and enclosing the light sensitive surface. Referring to Figures 1 and 2, the main frame structure is indicated at 1 and is similar to that described in the above-mentioned patent specification. A bell crank lever arrangement shown generally at 2, 2a pivoted on a bracket 2b is connected through rods indicated generally at 2c to means for locking a frame carrying the character bearing elements which is displaced and positioned in the same manner as the die case of the apparatus referred to above. A displaceable table similar to that described in the above-mentioned patent specification is provided with a weight and cable arrangement indicated at 3 by which it is normally drawn in the direction of type depth and carries an enclosure 4 containing the light sensitive surface or photographic film. A window 5 for a so-called panel A mechanism 6, to be later described, is also provided. A lever arrangement indicated generally at 7 effects the required control of the light source and a displaceable frame containing the character bearing elements is indicated generally at 8. A light-tight enclosure or screen is shown at 9, and 10 is a handle for actuating the latch of a door 10a in the enclosing cover 9. A lever 11 is provided for manually bringing the machine to rest, and a mechanism for controlling table depth movement is generally indicated at 12. Referring to Figure 2, 13 indicates the known tong mechanisms as employed in machines known under the registered trade-mark Monotype which control the displacements of the frame for the character bearing elements. An electric motor 14 drives the main shaft of the apparatus by a belt 15. A pivoted lever 16 is actuated by a cam 17 for operating the panel A mechanism through a rod 18, the said mechanism including a rotatable disc 19 carrying gauge rods 20 which cooperate with a settable member 31, and a driving rack 28 to which is connected a link shown generally at 30, but comprising separately actuated rods as described hereinafter for effecting the required control of the focal planes. A tube carrying the light source is indicated at 23, and 24 indicates the means, as described in the previously mentioned patent specification, for clamping the displaceable frame 8, the fixed frame of the apparatus being indicated at 22. A control arm 26 and a connecting arm 27 associated with the tong mechanisms determine the position of the displaceable frames. A linkage 29 from the panel A mechanism controls the sizing or image size varying means. The paper tower of the known apparatus is indicated at 21. The above mechanisms will be described in detail hereinafter.

Referring to Figures 3 and 4, a metal cover 9 is mounted on the stationary main frame 22 and is arranged to exclude light entering from below the table and also encloses all bearings, rods, links and other operative parts associated therewith. An electric lamp 32 constituting the source of illumination is carried in a holder 32a on a mounting tube 33 having a cap provided with ventilation apertures 34 to assist in heat dissipation. The mounting tube 33 is slidable in a fixed mounting 35 which is carried on a bridge plate 50 supported on vertical legs (not shown) from the main frame 22. An optical condenser 36 of conventional form is carried in a reduced portion 36a of the mounting tube 33.

The lamp mounting tube 33 is connected to a pair of side by side levers 38 by pivots 38a, the ends of these levers being pivoted at 43 on the bracket 2b. Thus by moving said levers up or down, the light source is moved away from or towards the light sensitive surface or film on the table. The levers may be loaded by a spring 106.

A pair of levers 46 are pivoted at 46a and are actuated through an arm 44 from a cam (not shown), the arrangement being similar to that described in the above-mentioned patent specification. These levers are connected through spring boxes 45 to rods 46b which actuate means for locking the displaceable frame as described hereinafter.

A pair of levers 39 are pivoted at 42 to the bracket 2b and are connected to the levers 38 by a rod 37, the latter being attached to cross members 40 and 41 joining the respective pairs of levers as shown in Figure 3. The ends of the levers 39 are pivotally connected at 78 to an optical lens mounting 77 carrying a focussing lens system 77a, the mounting 77 being vertically slidable in a guide tube 79 which forms part of the fixed framework carrying the displaceable frame 60. The interconnection of the pairs of levers 38 and 39 ensures that the light system including the condenser and the focussing lens system will always move in unison and will be maintained at the same distance apart although varying their distances from the object and image planes. A wedge engaging member 75 is mounted on a pivot 76 connecting the levers 39 and rests upon a lifting wedge 74 which is slidable upon a horizontal frame member 74a and can be actuated by a rod 73. Suitable mechanism to be later described and referred to as panel A mechanism is provided for actuating the rod 73, and according to the positioning of the said rod, so the light system and focussing lens system will be positioned relative to the object and image planes. The arrangement of the wedges 74 and 75 in relation to the levers controlled by them is such that a displacement of the wedge 74 by a few thousandths of an inch produces a considerable variation in image size.

A shutter 80 of the usual camera type having a control cable 81 is mounted below the guide tube 79 for controlling the period of illumination of the light sensitive surface carried on the table.

Means is also provided for limiting the time during which the character bearing elements carried in the frame 60 are illuminated. It will be understood that continuous illumination of the character bearing elements may result in undesirable heating and, in some circumstances, even burning of such elements, and it is accordingly desirable to shut off the light rays when these are not required for purposes of photographic exposure. For this purpose a shutter or similar device 52 is mounted in the guide tube 35 below the condenser 36 and is controlled by a cable 53. This shutter may be of the ordinary camera type if desired, and is opened before the shutter 80 is opened and closed after the latter has closed. The operating means for these shutters will be described later.

A variable aperture 54 which may be of the usual iris type as employed in cameras is mounted below the previously mentioned shutter 52. A stud 55 which actuates the variable aperture is engaged in a cam slot 56 in the mounting tube 36a so that as the light system is displaced vertically the aperture is varied. It will be understood that with a given light source, the intensity of illumination of the image at the light sensitive surface or film will vary with the size of the image. Thus if the conditions are such that an image of the maximum size is adequately illuminated, the intensity of illumination with an image of the minimum size would be excessive and likely to result in unsatisfactory reproduction. It is therefore desirable that the amount of light should be reduced as the size of the image is reduced and this is effected by the above arrangement, the size of the aperture being varied in accordance with the magnification of the object.

The plate 58 which forms part of the structure carrying the displaceable frame 60 is apertured at 57 to permit passage of the light to the focussing lens. The lever 26 (see also Figure 2) actuated from the known tong mechanism is connected by a link 26a to the frame 60 for effecting displacements thereof in one direction in a known manner. A second frame 61 has a tongue and groove connection with the frame 60 and is movable at right angles to the latter in a known manner by means of the second tong mechanism. The frame 61 is actuated through the medium of a rack bar 93 and this bar can be locked in position by plungers 93a actuated from the previously mentioned rods 46b as shown in Figure 4. The rack bar 93 is connected to a rod 94 passing through a bushing 96 in the cover 9 and is actuated by an arm 95 as in the apparatus described in the previously mentioned patent specification. Slidable vertically within the frame 61 is a character element case 62. The character bearing element or elements are indicated at 65 and are held between a glass supporting plate 63 and a glass cover plate 64. The case 62 has pairs of depending lugs 66 which are supported and freely slidable upon rods 67 which are connected by cross rods 68 to pairs of wedge engaging elements 69 which rest on pairs of wedges 70 slidable in fixed horizontal guides 70a. The wedges 70 are displaceable horizontally by means of rods 71 and 72, these rods being also shown in Figure 2. It will be seen that by displacement of the rods 71 and 72, the character element case 62 can be given vertical movements independently of the movements of said case in the horizontal plane and also independently of the vertical movements of the light system and focussing system as determined by the wedge 74. These movements are controlled by the panel A mechanism to be described hereinafter.

The cover 9 is provided with light-tight bushings such as 47, 48 and 96 for the passage of rods having longitudinal motion only. Where a lever, such as the lever 39, passes through the cover, a light-tight slide 49 is provided.

The apparatus includes a table 82 provided with an intermediate plate 83 for supporting the photographic film enclosure. This table is displaceable in a horizontal plane in line length and line depth directions and is constructed and operated in a manner similar to that of the table described in the specification of patent application No. 148,132 so that a detailed description of the construction is not necessary. The table 82 is slidable upon glide bars 82a (see Figure 7) which are connected at their ends to tie bars 82b and these tie bars run in grooves formed in opposite sides of a rectangular box frame 110 (see Figure 7) which in this construction is not given a rising and falling motion. The arrangement is such that any point on the intermediate plate surface can be brought beneath the light projection axis determined by the focussing lens 77a. Movement of the table in the direction of line length is determined by the mechanism described in the previously mentioned patent specification and includes the sizing rod 82c of the existing composing machine, the set blade 82d, the transfer bar 82e, and the set bar 82f attached to the sizing bars 82g (Figure 7) which run through the table and can be clamped thereto. The table is movable in line direction along the glide bars and can be clamped thereto. Table displacement is effected by the air cylinder 82h, the pistons of which are connected to the tie bars. The travel of the table in line depth direction takes place by sliding of the tie bars 82b in their slots and is controlled by point bars 82i which can be clamped to the tie bars. Further details of the mechanism and operations by which the control of the table displacements is effected will be found in the patent specification referred to previously.

From Figure 3 it will be seen that tongues 84 are secured to the table intermediate plate 83 and these are engaged in grooves in the side walls 85 of the enclosure or box which carries the photographic film. This enclosure is provided with a removable sliding floor 86 which enables blanks to be cleared away if the film is punched or perforated as described hereinafter. The perforating mechanism for this purpose is indicated generally at 105 in Figure 4. One end of the enclosure is provided with a cover plate 87 which extends over the winding spool holder 89. The supply spool holder is shown at 89a. One of the spools is rotatable either by hand or automatically from outside the enclosure as will be described later. The film 90 is passed over guide rollers 89b adjacent the spools and over a horizontal supporting plate 91 between said guide rollers. The film passes beneath two upper guide rollers 89c located near the rollers 89b and the rollers 89c are drawn by springs 89d against the rollers 89b so that the sensitive or emulsion surface of the film is always in the plane determined by the supporting plate 91. To accommodate different widths of films, the enclosure may be provided with an adjustable partition wall (not shown) which extends in the direction of the length of the film and carries one side of the spools. One of the upper guide rollers 89c may also be adjustable to various positions along the length of the enclosure if desired. For use with cut film, the supporting plate 91 may be provided with threaded or tapered holes to receive screws or dowels for securing the edges of the film. Alternatively, spring clip devices can be used. Sensitized plates of other material such as glass, metal, plastic material or paper can be similarly employed and carried by the supporting plate 91. The enclosure box has a sliding lid 88 which when closed abuts the cover plate 87, and can be opened in accordance with table displacement as described hereinafter.

Means is provided for preventing possible fouling of the focussing lens mounting 77 by the perforating mechanism 105 on the enclosure box when the latter is withdrawn from the apparatus, this being effected by ensuring that the lens mounting is lifted prior to withdrawal of the box. A door 103 hinged at 104 is provided in the cover 9. A rack 102 (Figure 4) operatively connected with the door is engaged with a pinion 98 on a shaft 97 which passes through a light-tight bushing 99 in the cover 9. The arrangement is such that on opening the door 103 the rack 102 is given a transverse movement so that there is imparted to the shaft 97 a partial rotation. Secured to the shaft 97 is an eccentric cam 100 arranged to actuate a roller 101 mounted on the lever 39 as shown also in Figure 7. Upon partial rotation of the cam, the levers 39 are raised so that the wedge engaging member 75 is lifted away from the wedge 74 and at the same time the focussing lens mounting is lifted clear of the film enclosure box. When the box has been returned to the table and the door 103 has been closed, the cam 100 is returned to its initial position and the wedge engaging member 75 is returned to rest on the wedge 74. Thus the position of the focal plane remains unaltered. Further details of the film enclosure box will be given hereinafter.

An alternative mode of adjusting the light system and focussing lens system is shown in Figure 5, the only essential difference as compared with the previous example being that the movements are effected by screw threaded means operated by racks and pinions instead of by wedges. The lamp mounting tube 33 is threaded as shown at 33a and is engaged in a nut 35a rotatably mounted in the fixed mounting 35 so that the nut cannot move vertically. The nut 35a has teeth 35b formed on its periphery which mesh with a longitudinally displaceable rack 35c which is actuated from the panel A mechanism, thereby adjusting the lamp and condenser system in a vertical direction. The lamp mounting 33 is suitably guided to prevent rotation thereof. In a similar manner the focussing lens mounting 78 is externally threaded at 78a and is engaged by a nut 79a rotatable but not vertically displaceable in the fixed mounting 79. The nut has teeth 79b formed on its periphery which are engaged by a longitudinally displaceable rack 79c, the latter being actuated from the panel A mechanism. The lens mounting 78 is held against rotation by a pin (not shown) engaged in a vertical slot 79d in the fixed mounting 79. It will be understood that the racks 35c and 79c are actuated by a common element in the panel A mechanism so that the relation between the light source and the lens remains unaltered during their vertical motions. The other parts of the apparatus are the same as in the previous example, and are given the same reference numerals.

It will be seen that in the two examples described above, the vertical position of the plane of the light sensitive surface or film is not altered. The object case 62 is given displacements in a horizontal plane to bring the desired characters in succession into the light projection axis and the table is also given displacements in a horizontal plane so that the image of each character can be photographically reproduced on the film to afford spaced lines of characters, the light controlling shutter being opened for the required exposure period at each relative positioning of the object case and table. When it is desired to vary the size of the reproduced character, the light system and the focussing lens system are given the required vertical adjustment and the frame 60 is also given a suitable proportional vertical adjustment so that the characters will be correctly reproduced to the different size required. The required proportionality of these vertical adjustments is ensured by suitable dimensioning and operation of the cams 70 and 74.

It will be understood that any suitable type of focussing lens system can be employed, for example an anastigmatic or petzval lens.

Instead of moving the object plane, i. e. the plane of the character bearing elements in conjunction with the variation of image size, the required result may be achieved by moving the light sensitive surface or film, the object plane remaining relatively stationary. This is effected by imparting the desired vertical adjustment to the table, and one convenient construction for this purpose is shown in Figure 6. The table structure indicated generally at 82 carries an intermediate plate 83 for supporting the photographic film enclosure box as previously described. Depending vertical rods 121 are secured at each corner of the table and the lower ends of these rods are connected in pairs by slide bars 122 which rest on cross bearer members 123 and are retained thereon by guides 124 attached to the table. Depending posts 125 attached to the ends of the bearer members 123 are grooved at 125a to fit over guide bars 126 so as to be slidable along said bars without side play. The guide bars 126 are attached to cranks 129 by means of pins 126a which pass through slots 127a in plates 127, and by links 126b. The plates 127 are secured to the stationary frame 22 and form guide surfaces over which the guide bars 126 can move vertically. The cranks 129 are pivotally mounted on brackets which are secured to the frame members 110. Links 130 connect the cranks 129 to levers 132 by means of pins 131. The levers 132 are secured to a shaft 133 to which is also secured a lever 134 having a head 135 connected to a rod or link 136 which is actuated by a head 1027 from the panel A mechanism. Actuation of the link 136 in a manner to be described later will effect vertical adjustment of the table carrying the photographic film or other light sensitive surface. This adjustment is effected in conjunction with the adjustment of the light source and focussing systems as previously described, the object plane remaining stationary so that the desired variation in the size of the reproduced image is achieved. This table adjustment mechanism may be employed, if desired, in place of the arrangement now to be described.

Another mode of carrying the invention into effect, in which the object plane remains stationary and the image plane is adjusted in conjunction with the light source and focussing lens systems is shown in Figures 7 and 8. In this arrangement the light source and focussing lens are adjusted in unison by means of the levers 38 and 39 by actuation of the rod 73 connected to the cam 74 as described in connection with Figures 3 and 4, but the case 62 which contains the character bearing elements constituting the object plane is not adjustable vertically but remains in the same plane, being displaceable in this plane for the positioning of the selected character in the axis of light projection by appropriate movements of the frames 60 and 61 as previously described. The table structure 82 carries the intermediate plate 83 which is supported on four posts 121 slidable vertically in the said structure. The posts 121 are connected in pairs at their lower ends by slide bars 122 which are freely slidable upon the upper surfaces of spaced bars 123 which are retained laterally in relation to the table structure by guide members 124. Depending members 125 at each end of the bars 123 have slots 125a which engage over and are slidable upon cam bars 126 having at each end a wedge engaging member 126a each resting upon a wedge 107. The wedges 107 are connected in pairs by bars 108 and are slidable in horizontal guides 109 attached to the frame 110 which is stationary in the main frame 22 of the apparatus as previously described. Rollers 111 on the cam bars 126 are engaged in vertical slots 112 in the guides 109, thus permitting vertical movement of the cam bars but preventing longitudinal displacement thereof. The wedges 107 are actuated by a rod 108a connected to a head 1027 of the panel A mechanism. It will be understood that the table 82 is given displacements in the directions of line width and line depth by mechanism similar to that described in the patent specification referred to previously. The operation of this arrangement is similar to those previously described except that the plane of the object case 62 remains in one vertical position and the required proportional vertical adjustments are imparted to the light system and focussing lens system on the one hand and to the plane of the light receiving surface or film on the other hand.

It may be desired in some circumstances to provide mechanism for perforating the photographic film so as to provide a punched hole at the end of each line of photographically reproduced characters to facilitate the subsequent correction of any errors that may arise or the replacement of the lines by others. For this purpose a mechanism is employed which is similar as regards its main features to the perforating mechanism described in the specification of patent application No. 148,132. Referring to Figure 9, the enclosure box 4 for the photographic film is supported on the intermediate plate 83 of the table structure 82 as previously described. A longitudinally slidable perforator bar 114 is supported on cam blocks 113 on the stationary frame 110 and can be actuated from a suitable cam and lever arrangement. Movement of the perforator bar to the left causes its cam projections 114a to ride up the cam blocks 113. Plungers 115 loaded by springs 116 are connected at 117 to levers 105 fulcrummed at 118 and connected at their further ends to perforating punches 115. The edges of the photographic film, which is wound on the spool 89, are led through slots 119a in a part 119 of the punch housing, these housings being apertured to permit guided downward movement of the punches 115. Thus movement of the perforator bar 114 causes the punches to perforate the film. The blanks produced by such perforation fall to the bottom of the enclosure and can be removed when the box is re-loaded. The springs 116 return the punches to their initial position after the perforator bar 114 has been likewise returned. The housings 115b for the punches are slidably mounted on parallel bars 115c, as shown in Figure 3, which are secured to the table frame. The punches are held stationary in line depth direction by anvil rails 115d and 115e secured to the cam blocks 113. It will be appreciated that this perforating mechanism is not required when the apparatus is employed in conjunction with mechanism as described in the specification of patent application No. 229,342.

A drive shaft 130a for the take-up or winding film spool 89 has a keyway 131a whereby it is slidably keyed to a spool driving disc 132a rotatably mounted in a wall 85a which may be adjustably positioned within the box if desired according to the width of film employed. The winding spool carries a pin 133a which is received in a recess in the disc 132a for driving the spool. The shaft 130a is supported in bearing elements 85b and 85c and to its further end is secured a ratchet wheel 134a engaged by a pawl 135a on a disc 136b to which is affixed a pinion 136a. A fixed rack 137 engages the pinion so that when the table is moved in page depth direction during reproduction the pinion 136a rotates freely but when the table movement is reversed to position the receiving surface for the start of a new page the shaft 130a and with it the spool 89 are rotated to wind up the film. To obtain a varying amount of space on the film between the end of one page and the start of the next, the table can be further displaced by hand if required, or the aforesaid rack and pinion may have an increased ratio or a differential gear may be employed. The shaft 130a may also be arranged to drive a counter or other device such as a steel tape so that the amount of film wound up can be readily ascertained.

Means is provided for determining the successive movements of the table in the direction of line depth and such means is illustrated in Figures 7, 10 and 11. A control frame 12 is slidable vertically in a bracket 180 rigidly secured to a leading shelf 180a on the main frame 22 of the apparatus. The bracket 180 has inwardly extending posts 180b. The frame 12 has bosses 180c slidable on the posts and urged inwardly by springs 180d. The frame 12 carries a series of blocks or type depth point gauges 144, 145, 146, 147 of different thicknesses which can be interposed between the ends of the rods 148 on the point transfer bar 149 of the table mechanism (which is the same as that described in the specification of patent application No. 148,132) and the leading bar 151, 152 carried in the frame 150. The lower end of the control frame 12 is connected by a link 143 to a bell crank lever 141 pivoted at 142 and connected by a rod 140 to the head 1134 of the panel A mechanism to be described hereinafter. The springs 180d maintain the point gauges or blocks in engagement with the ends of the point transfer bar rods 148. Thus by displacing the control frame 12 into the required position, which is effected automatically by the panel A mechanism, the table movements in line depth direction can be varied as required.

The mechanism for operating the shutters as previously described is shown in Figures 12 and 13 and makes use of the cam of the apparatus described in patent specification No. 148,132 which in that apparatus controls the rise and fall of the table frame and is not required for this purpose in the present arrangement. The said cam which is driven from the main shaft of the machine, is provided with a hump surface 155 which, upon rotation of the cam, engages a roller 156 freely rotatable upon one end of a lever 157 pivotally mounted at 159, the pivot being carried by a bracket 159a mounted on the justification frame 159b of the apparatus according to the above-mentioned patent specification. To the further end 158 of the lever is attached one end of a Bowden cable 161 in a casing 81 for controlling the shutter 80 shown in Figure 3 or 5. Where a second shutter is provided, as previously described, for protecting the character bearing elements from overheating, this can be controlled in a similar manner from the same lever 157, 158. A stop 162 limits the return motion of the lever after operation. The operating cables are arranged so that the protective shutter 52 will be opened before the exposure shutter 80 and will be closed after the latter has closed. It will be understood that the shutters are of the usual camera type which can be pre-set to open for a given time when operated, and this timing is not influenced by the cable operating means which only initiates the opening of the sutters. By reason of the fact that the lever 157, 158 is pivoted on the justification frame, this lever will be moved out of the path of the cam and consequently will not be operated when the said frame is displaced during wedge setting for single and double justification, cancelling, automatic sizing or image size variation, lens mount setting, focussing and like operations which involve displacement of the justification frame. Thus there is provided a convenient means for preventing shutter operation at these times and ensuring that undesired characters are not reproduced.

As previously described, the main frame 22 of the apparatus carries a metal cover 9 for light exclusion and the light projection system is mounted in an aperture in a suitable position in the top plate of this cover as seen in Figures 3 and 7. Referring to Figures 14, 15 and 16, a door 103 hinged at 104 is provided in the side of the cover through which the film enclosure box 4 can be introduced by sliding upon the table. The door is provided with felt packing 103a to ensure exclusion of light. Mounted in the door is a guide 103b for a key (not shown) which can be inserted to engage the projecting slotted end 103c of the spool in the enclosure box for winding the film. The aperture in the guide 103b is closed by a pivoted flap 103d. The enclosure box 4 is positioned upon the table interplate 83 and is held laterally by guides 84. The cover 9 has an inset portion 9a and on this is mounted a slide 160 movable parallel to the door by means of a handle 160a. A plunger 162 carried in the handle is loaded by a spring 162a and has a peripheral groove 162b which can be locked in one position (when the plunger is depressed) in a key-hole slot 163 in the cover to prevent accidental movement of the slide. The slide 160 has tongues 174, 174a and 174b which can be engaged with lugs 175, 175a and 175b on the door 103 for locking the latter in closed position. An upwardly extending flange 170 on the sliding lid 88 of the film enclosure box 4 engages in a groove 171 in an arm 172 secured to the slide 160. The arm 172 extends across the width of the enclosure box as seen in Figure 15 so that its groove remains engaged over the upstanding flange 170 as the box 4 is moved with the table in the direction of line length during the reproduction of a line of characters. A safety plunger 173 is mounted on the cover 9 and is loaded by a spring 173a and is arranged to prevent movement of the slide during the introduction of the box as later described. A spring 161 mounted on the cover engages the arm 172 and thereby urges the slide 160 to the right as viewed in Figure 15. A cam face element 178 is secured at one end of the box 4 and is arranged so that when the box is properly positioned on the table intermediate plate it engages a feeler pin 179 adjustably mounted on an arm 179a secured to a rod 179b rotatably mounted in bearing members 179c and 179d. A second arm 181 secured to the rod 179b is loaded by a spring 181a and connected by a link 181b to a pivoted lever 182 having a recess 183. A lug 184 depends from the slide 160 and can enter the recess 183 as later described. The slide 160 is formed with rack teeth 102 meshing with a pinion 98 on a shaft 97 which, as shown in Figures 4 and 7, has secured to it a cam 100 for raising the focussing lens mounting.

Assuming the door 103 to be open prior to the insertion of the film enclosure box 4, the slide 160 will be held to the right as viewed in Figures 14 and 15 by the spring 161, and the locking plunger 162 will be in the slot part of the key-hole 163 with its groove 162b engaged therein. The sliding lid 88 of the enclosure box 4 containing the film will have been closed against the end cover plate 87 shown in Figure 3, and the closed box is inserted through the door 103 by sliding it into engagement with the runners 84 on the table intermediate plate, the upturned flange 170 on the lid being at the same time engaged in the groove 171 of the arm 172. In this position the safety plunger 173 projects forwardly into engagement with the lug 174 on the slide 160 and prevents the latter from being moved to the left, so that the lid 88 cannot be opened since it is held with the slide. The door 103 is then closed and the lug 175 thereon engages the safety plunger 173 and forces it rearwardly out of the path of the lug 174. The slide 160 can then be moved to the left so that the plunger 162 enters the hole portion of the key-hole 163 and rises under the action of its spring 162a, thereby preventing any return motion of the slide to the right. The above-described movement of the slide to the left causes the depending lugs 174, 174a and 174b to be engaged in front of the lugs 175, 175a and 175b on the door, thereby securing the door against opening. The positioning of the box 4 on the table intermediate plate has previously caused the cam surface 178 to engage the feeler pin 179 and raise the lever 182. As the slide 160 is moved to the left, the depending lug 184 moves immediately below the recess 183 in the lever 182. This movement of the slide also moves the lid 88 of the film enclosure box to the left through the upstanding flange 170, thereby uncovering a narrow strip of the film at the opposite end of the box sufficient for the reproduction of the first character. As the enclosure box is displaced in the direction of line length, the cam face 178 leaves the feeler pin 179 and allows the lever 182 to drop and engage the lug 184 in its recess. The slide 160 is thus locked in position and cannot be moved until the box 4 is returned to its original starting position, when the cam face 178 again raises the lever 182 and thereby releases the slide. When this has been done the slide can be moved to the right with the plunger 162 depressed which closes the sliding lid 88 of the box 4 and also disengages the slide lugs 174, 174a and 174b from the door lugs 175, 175a and 175b. The door then opens under the action of the spring loaded safety plunger 173 and the film enclosure box can be removed. It will be noted that the above movement of the slide 160 also actuates the shaft 97 through the rack 102 and pinion 98 to raise the focussing lens mounting as described in connection with Figures 4 and 7, and thereby prevents any possibility of the box 4 fouling the lens mounting as it is removed. It will be seen that during the operation of the apparatus, movements of the table and the film enclosure box 4 in the direction of line depth will cause the box lid 88 to be successively withdrawn to expose sufficient film for reproduction of the successive lines of characters. When the table is returned to the starting position, the lid 88 will be nearly closed, and the movement of the slide 160 to unlock the door 103 as described above will complete the closing of the lid. Thus by this arrangement it is ensured that the box 4 cannot be opened on the table unless the cover door is closed, and the said door cannot be opened until the box lid has been closed.

Whilst the use of an enclosure box as above described for the film or other light sensitive receiving surface is to be preferred, this can be omitted if desired and the light sensitive surface may be merely clamped or otherwise secured to the intermediate plate of the table, provided that suitable means is employed to prevent light reaching the surface during loading and unloading.

Mechanism for effecting the required co-ordinated control of the light system and focussing system, the plane of the image or object, and the table movements in line depth direction, previously referred to for convenience as panel A mechanism, is shown in Figure 17. This mechanism is similar in most respects to that described in the specification of patent application No. 229,342 to which reference is made.

A cylinder block 1090 is formed to include four cylinders in which slide pistons MD, ME, MF and MG (the piston ME has been omitted from the drawing for greater clarity) which can be actuated from corresponding compressed air supplies. The piston rods extend through holes in a cylinder block cover 1090a to engage a rack base plate 1091. The piston MD has a stop extension 164X which limits its upward lift. The piston MF has a shorter stop extension 162X, and the piston MG has a still shorter stop extension 161X, the piston ME having a stop extension intermediate between those of the pistons MD and MF. Thus the base plate 1091 can be raised to different heights according to which of the pistons is supplied with compressed air. A rack 156X carried by the base plate 1091 has teeth formed on one side thereof meshing with gear wheels 1101 and 1061 which are rotatable in bearings which prevent endwise movement of the gear wheels. On the opposite face of the rack 156X are formed ratchet teeth 159X which can be engaged by a detent 158X to retain the rack in the position to which it has been raised. The detent 158X is loaded by a spring 1075 and can be actuated to release the rack either by a compressed air piston M5X or by a rod 508C. A splined shaft 1060 is slidably engaged in the gear wheel 1061 and has secured to it a disc 1050 in which are inserted four gauge rods of which three are shown at 1066, 1067 and 1068. These gauge rods are shown in Figure 2 by the general reference 20, and their purpose is to control the setting of the light and focussing lens systems and of either the image plane or the object plane in the apparatus as previously described. For this purpose the gauge rods are accurately dimensioned for effective length and they may conveniently be marked as Pica, Long Primer, and so forth corresponding to the size of type faced character required.

A lever 1000 is actuated by a cam or other suitable means on the main shaft of the apparatus and is arranged to actuate a rod 1002 through the medium of an interposed mechanism which will be described later. The rod 1002 is freely slidable in a bracket 1003 forming part of the framework for the rack 156X and is attached to a crosshead 1004 which is slidable upon the shaft 1060 and also upon a shaft 1052 which is in slidable splined connection with a pinion 1053. The pinion 1053 and the shaft 1052 may be associated with mechanism as described in the specification of patent application No. 230,642 for adjusting a variable wedge control device for determining the width or spacing of the characters. This part of the mechanism has been omitted from the drawing for greater clarity, but it is fully described and illustrated in the specification referred to above. The shaft 1052 is connected to a lug 1011 on a slidable bar 1014 in a manner permitting the shaft to rotate freely in the lug but affording an endwise connection therewith. The shaft 1060 is similarly connected to a lug 1012 on a slidable bar 1013. The bars 1014 and 1013 are mounted for longitudinal sliding movement in guides in a frame 1019 and are retained in position therein by cross members 1015 and 1016. A spring 1002a surrounds the rod 1002 and extends between the bracket 1003 and the crosshead 1004, thereby tending to move the crosshead to the right as viewed in Figure 17. The slidable bar 1013 extends beyond the frame 1019 and carries a head 1026 to which is connected a rod 73 which is the light system and focussing lens actuating rod of the forms of apparatus shown in Figures 3 and 7. In the form of apparatus shown in Figure 5, the rod 73 will be connected to both racks 35c and 79c.

The crosshead 1004 carries a spring loaded buffer 1007 which, when the crosshead is displaced towards the disc 1050, engages one of the gauging rods mounted on the said disc, according to the angular position of the latter, and displaces the disc together with its shaft 1060 through a distance depending on the length of the particular gauge rod engaged. To control the longitudinal displacement of the shaft 1060, there is provided a hydraulic damping device comprising a cylinder 1063. The details of this are the same as that of a similar device shown at 1063a and applied to the shaft 1052. A piston 1054 fixed to the end of the shaft is displaceable in a cylinder 1063b.

As the piston moves into the cylinder, oil is forced out through the bleed hole 1055, which is adjusted by a needle valve 1056, into a reservoir (not shown). On the return stroke the oil returns to the cylinder through a spring loaded ball valve 1058.

Each of the above-mentioned gauge rods is adjustably secured in a thimble which can be inserted in a hole in the disc 1050 and also carries an adjustable collar. Considering the gauge rod 1066 as an example, this is threaded at one end into a thimble 1066a and secured by a lock nut 1066b. The other end of the rod is threaded to receive a collar 1066c which is secured by a lock nut 1066d. By this means the effective length of the gauge rod and the distance of the collar from the disc 1050 can be precisely adjusted. The thimbles 1066a are removably fitted in the disc 1050 and hence the gauge rods can be readily exchanged for other rods when required.

Means is provided for locking the sliding bar 1013 in the position to which it is set by movement of the crosshead 1004. Such means comprises a wedge 1200 engageable with a suitably shaped fixed member 1201 forming part of the frame 1019, and loaded by a spring 1205, the wedge riding on the bar 1013. For releasing the wedge, a cross bar 1203 is secured in a rod 1203a which is slidable longitudinally in a part 1203b of the fixed frame and is loaded by a spring 1203c. A projection 1206 is secured to a rod 1207 slidable in a frame bracket 1207a and having its other end attached to the crosshead 1004 as indicated at 1207b. A slotted block 1204 is horizontally slidable on a vertically guided rod 1127 which is connected by a link 1048 to a piston 1048a which can be actuated by compressed air from the combined 0005 and M air supply of the composing machine. When the said piston is raised, the block 1204 will be interposed between the projection 1206 and the end of the rod 1203a carrying the cross bar 1203. In these circumstances, if the crosshead 1004 is drawn to the left by the lever 1000, the projection 1206 will drive the rod 1203a through the interposed block 1204 and cause the cross bar 1203 to strike the wedge 1200, thereby releasing the sliding bar 1013 which is returned to a zero position by its loading spring 1044. It will be seen therefore that to effect a new setting, two strokes of the lever 1000 are required, the first stroke being effected with the block 1204 raised to release the wedge and so free the bar 1013 and the second stroke being effected with the block 1204 lowered, resulting in the re-setting of the bar 1013 to the next required position.

Adjustment of either the object plane or the image plane in the forms of apparatus previously described is effected by a bar 1212 slidable horizontally in guides in the previously mentioned fixed frame and loaded by a spring 1213. The bar 1212 carries a head 1027 which is connected to the rods 71 and 72 in the form of apparatus shown in Figure 3 where the object plane is adjusted. With the form of apparatus shown in Figure 7, the head 1027 will be connected to the rod 108a in the latter figure, and with the apparatus shown in Figure 6, the said head is connected to the rod 136. An extension rod 1211 is secured to the sliding bar 1212 and carries a projection 1210 which lies in the path of the collar, e. g. 1066c, of the appropriately positioned gauge rod on the disc 1050. When the crosshead 1004 is displaced to the left to engage and displace the said gauge rod, the collar on said gauge rod will engage the projection 1210 after the gauge rod has travelled a certain distance, and the remainder of its travel will thereafter be transmitted to the sliding bar 1212 for adjusting the image plane or object plane as the case may be. It will be appreciated that the focussing lens requires to be adjusted through a considerably greater distance than either the image plane or the object plane, and the above-described arrangement provides a convenient means of meeting the requirements. The sliding bar 1212 is locked in its adjusted position by a wedge 1214 (similar to the wedge 1200) which is loaded by a spring 1214a and acts against a fixed member 1215. The wedge 1214 is released by the cross bar 1203 in the same manner as the previously described wedge 1200.

Means is also provided for effecting the desired control of the means for determining the successive movements of the table in the direction of line depth as described in connection with Figures 10 and 11. A pinion 1101 in mesh with the vertically movable rack 156X is secured to a shaft 1135 carrying a disc 1102 on which are mounted a series of gauge rods three of which 1103, 1104 and 1105 are shown, the lengths of which correspond to the required displacements of the control frame 12 of Figures 10 and 11 to bring the different point or gauge blocks into position. The crosshead 1004 has a cylinder 1131 formed on or secured to its lower end through which passes a rod 1108 to which is secured a collar 1130 slidable within the cylinder. A spring 1132 engaging the collar 1130 bears against a cover 1131a at the opposite end of the cylinder. One end of the rod 1108 has attached to it a head 1134 connected to the rod 140 of Figure 10. The opposite end of the rod 1108 is secured to a toothed rack 1120 slidable in a casing 1120a and arranged so that the end face 1101 of the rack can be engaged with one of the aforesaid gauge rods, according to the angular position of the disc 1102, when the crosshead 1004 is displaced to the left as viewed in Figure 17. The rack 1120 is retained in the position into which it is thus moved by a vertically movable pawl 1121 connected to a bell crank 1122 pivoted at 1122a and connected to a rod 1123 which is also connected to a bell crank 1124 pivoted at 1126. One arm of the bell crank 1124 is connected by a pin 1125 to the vertical rod 1127 and a handle 1405 is secured to the further end of this arm. The rod 1123 is loaded by a spring 1123a anchored at 1123b. The bell crank 1122 is also connected by a link 1406 to a bell crank 1407 pivoted at 1408, and the bell crank 1407 is connected by a rod 1409 to the end of the detent 158X which engages and holds the vertically movable rack 156X.

It will be convenient at this stage to consider the operations involved in setting the sliding bars 1013 and 1212 to obtain a new adjustment of the focussing lens and of the object or image plane of the apparatus. Assuming the said bars to occupy a previously set position, the piston 1048a is raised by supplying compressed air thereto so that the block 1204 is placed in the path of the projection 1206. The piston is actuated by M air. and this may be controlled in combination with 0005' air by corresponding perforations in the paper strip of the known composing machine. A single travel of the crosshead 1104 to the left will then result in actuation of the rod 1203a and cross bar 1203 from the projection 1206 to release the wedges 1200 and 1214 and thereby release the bars 1013 and 1212 which will then be returned to a zero position by their loading springs. After this action the piston 1048a will be returned and thereby remove the interposed block 1204.

To effect the required setting the appropriate piston MD, ME, MF or MG is actuated, thereby raising the rack 156X and setting the discs 1050 and 1102 to their appropriate positions. Upon the next displacement of the crosshead 1004 to the left the spring buffer 1007 engages the appropriately positioned gauge rod, which may for example be the rod 1066, and displaces this to the left through a distance which is accurately predetermined by the previously set length of the rod. This travel is transmitted to the sliding bar 1013 and thereby adjusts the light system and focussing lens system to the required setting. At the end of the travel of the crosshead 1004 the spring loaded wedge 1200 will lock the bar 1013 and prevent further movement thereof as the movement of the crosshead is reversed. During the travel of the crosshead 1004 to the left, the collar, e. g. collar 1066c on the actuated gauge rod engages the projection 1210 on the rod 1211 and thereby displaces the sliding bar 1212 through an appropriate distance for the desired adjustment of either the image plane or the object plane. The bar 1212 is likewise locked by the wedge 1214. The aforesaid displacement of the crosshead 1004 to the left also carries with it the rod 1108 through the resilience of the spring 1132 and the travel of this rod is determined by the end face 1101 of the rack 1120 striking the appropriately positioned gauge rod on the disc 1102, thus setting the means for controlling table depth movement as required.

It will be appreciated that the lever 1000 is continuously oscillated from a cam or other drive means on the main shaft of the machine and if this lever is permanently coupled to the rod 1002, the resultant displacements of the crosshead 1004 will produce a light tapping of the positioned gauge rod and this may cause displacement of the wedges 1200 and 1214 and may disturb the setting of the focussing lens and of the image or object plane. To prevent this possibility, means is provided for interrupting the coupling between the lever 1000 and the rod 1002. It will be understood that the mechanism for this purpose now to be described is an example only and other means for achieving the same object could be employed.

The lever 1000 is connected by a link 1001 to a fork 1300 carrying a bar 1301 having a downward projection 1303 at its opposite end. Situated below the bar 1301 is a slotted bar 1331 which is coupled to the rod 1002 by a threaded connection locked by a nut 1332, the ends of the slot being defined by portions 1302 and 1304. The relative positioning of the bars 1301 and 1331 is such that the bar 1301 can oscillate freely in the slot of the bar 1331 when the latter occupies the position shown. Below these bars is a second slotted member 1306, pivotally supported at 1307, in part of the fixed frame, which carries within its slot a displaceable engagement block 1305, channelled as shown at 1309 to slide freely in the slot. The end 1308 of the member 1306 furthest from its pivot is loaded by a spring 1303 tending to raise the said member. The engagement block has a depending lug carrying a roller 1311 offset therefrom and is also loaded by a spring 1328 tending to move the block to the right as seen in the figure. The roller 1311 can be engaged by a latch 1317 formed on a lever 1330 pivoted at 1318, to hold the member 1306 in its lower position as shown. The roller 1311 can be disengaged from the latch 1317 to allow the spring 1303 to raise the member 1306, this engagement being effected by displacement of the rack 156X. This rack has cam projections indicated at 1323 and 1326 formed on its side which are engaged by a roller pivoted at 1322 on a T crank 1320 pivoted at 1321. The latch lever 1330 is loaded by a spring 1329 and is connected to the T crank so that the aforesaid roller is held in engagement with the cam projections on the rack 156X. Thus any displacement of the rack 156X will effect the release of the roller 1311 from the latch 1317 and the member 1306 will be raised by its spring to place the engagement block 1305 between the end portion 1302 of the slotted bar 1331 and the projection 1303 on the bar 1301. It follows that the next movement to the left of the lever 1000 will be transmitted through the coupling so formed to the rod 1002.

A disengaging member 1314 is pivoted at 1312 to a part 1312a of the fixed frame and is urged upwardly by a spring 1313. The end 1310 of the said member is chamfered as shown and the member can be raised by its spring so that the chamfered end is above the path of the roller 1311 when the later travels to the left after the coupling has been effected as previously described. When the engaged block 1305 travels to the left, the roller 1311 rides along the upper surface of the member 1314 and depresses the latter against the action of its spring, but once the roller has left the chamfered end 1310 the member 1314 is raised and on the return movement of the block 1305 the roller will engage the lower surface of the member and is guided thereby so that it will be reengaged by the latch 1317, whilst at the same time the downward movement imparted to the roller 1311 will withdraw the block 1305 from its coupling relationship with the bars 1301 and 1331. It will be noted that as the block 1305, when in coupling engagement position, is moved to the left, the spring 1328 is compressed, and this spring will ensure the subsequent movement of the block to the right and the engagement of its roller 1311 with the latch 1317 when the block is withdrawn. The cam surfaces such as 1323 and 1326 on the rack 156X are suitably related to the rack teeth 159X which are engaged by the detent 158X, so that the T crank 1320 will be actuated as previously described whenever one of the compressed air pistons is operated to raise the rack.

Thus it will be seen that by appropriate positioning of the rack 156X as previously described the required settings for different image reproduction sizes are automatically obtained, the operation being effected by supplying compressed air to the appropriate piston under the control of the corresponding perforations in the known composing machine. Means is also provided for enabling the setting to be accomplished manually, i. e. independently of a perforated strip or like control, and this comprises a lever 1400 pivoted to the fixed frame at 1401 and connected at one end to the rack 156X. The opposite end of the lever is provided with a handle 1404 and passes through a controlling gate 1402 provided with recesses 1403 in which the lever can be positioned to afford the desired upward displacement of the rack and thus the required setting of the apparatus for photographic reproduction to the desired character size.

It will be understood that other means of operating the rack 156X can be employed if desired. Thus for example a bracket 505C attached to the rack may be connected to a rod 505C$^1$ which is actuated by a rotary drum having inserted studs as described in the specification of patent application No. 229,342.

The rack 156 X may be restored to zero position either by compressed air from the 0005 and M supplies in combination acting on the piston 1048a, or manually by moving the handle 1405 upwardly as previously described, either of these operations effecting the release of the detent 158X from the rack teeth 159X.

It will be understood that with the apparatus according to the present invention, pages of reproduced typographical matter can be made up with the use of perforated record strips including multiple line measures produced by a keyboard mechanism as described in the specification of patent application No. 229,341, the record strips so produced being used to control a composing machine of known kind used in conjunction with the present apparatus. In order to provide the required compressed air controlling impulses for the operation of the previously described panel A mechanism in a simple and convenient manner, without requiring relatively complicated keyboard manipulations (i. e. the use of combinations of keys which it may be difficult for the operator to remember), a control valve arrangement is provided as shown in Figure 18. The main compressed air supply is indicated at Z and the pipes indicated at 0005, M, D, E, F, and G lead from the known composing machine and are supplied with compressed air under the control of the corresponding perforations in the record strip of that machine. Pipes MD, ME, MF and MG lead to the corresponding pistons in the cylinder block 1090 for actuating the rack 156X of the panel A mechanism, and a pipe M$^1$ leads to the piston 1048a of the said mechanism. A piston valve $a$ controlled by the 0005 air supply is spring loaded and when actuated admits air to a multiple piston valve $b$ to displace said valve to the right as viewed in the figure. Compressed air impulses admitted to the pipes M, D, E, F or G will cause a corresponding spring loaded piston valve $c$, $c^1$, $c^2$, $c^3$ or $c^4$ to rise and thereby admit compressed air through any one of the air lines $d$, $d^1$, $d^2$, $d^3$ or $d^4$ through the previously opened multiple valve $b$ to raise corresponding spring loaded piston valves $e$, $e^1$, $e^2$, $e^3$ or $e^4$. The main air supply from Z is led by a pipe $f$ to the lower part of the piston valve $e^4$ and thence by way of pipes $f^1$, $f^2$, $f^3$ and $f^4$ to the lower parts of the piston valves $e^3$, $e^2$, $e^1$ and $e$. When the latter occupy their lowest positions as shown, the air supply from the pipe $f$ has access through the connecting pipes $f^1$, $f^2$, $f^3$ and $f^4$ to the lower part of the piston valve $e$. Also a second pipe line $g$ leads the main air supply from Z to the upper part of the piston valve $e$, and if this piston valve is raised the air is admitted through a connecting pipe $h$ having branches $h^1$, $h^2$, $h^3$ and $h^4$ to the upper parts of the piston valves $e^1$, $e^2$, $e^3$ and $e^4$. The arrangement is such that the multiple piston valve $b$ controls the admission of air to the cylinders of the piston valves $e$, $e^1$, $e^2$, $e^3$ and $e^4$ so that none of these valves can be actuated until the piston valve $a$ has been raised by a supply of 0005 air. The occurrence in the perforated record controlling strip of a combination of 0005 and M perforations will result in the actuation of the piston valves $a$, $b$, $c$ and $e$, and compressed air will be supplied to the pipe M$^1$ by way of the air line $f$ and the connections $f^1$, $f^2$, $f^3$ and $f^4$, thereby actuating the piston 1048a of the panel A mechanism of Figure 17 and returning the said mechanism to zero as previously described. The occurrence in the record strip of a combination of 0005, M and D perforations will result in the actuation of the piston valves $a$, $b$, $c^1$ and $e^1$, the latter closing the supply of air to the pipe $e$ so that no compressed air is supplied to the pipe M$^1$. The raising of the piston valve $e^1$ provides a supply of air to the pipe MD by way of the air line $g$ and the branch line $h^1$, so that the appropriate air piston MD of Fig. 17 is actuated to raise the rack 156X by the required amount. A similar combination but including the E, F or G perforation instead of the D perforation will result in actuation of the appropriate piston of the panel A mechanism. It will be understood that the air lines M, D, E, F and G of Figure 18 can be connected with the existing system of air ways on the known composing machine or the known paper tower in any convenient manner, and it is not thought necessary to illustrate such connections.

The object element or elements which provides the images by which the photographic reproduction of the characters is effected may, if desired, comprise a class plate, film, or other transparent sheet such as astrafoil bearing the characters in negative form. The character arrangement can be similar to that in known die cases, as for example in the machines known under the registered trade-mark Monotype, but any other arrangement may be adopted, and the sizes of the individual characters may be chosen as required. Usually the character will be reversed on the negative but in some circumstances this is not essential. Also a positive element may be employed, i. e. one in which the characters are black on a white ground, and these may be reversed or not as required. By having the characters normal or reversed and appropriately controlling the widthwise travel of the table as described for offset in patent application No. 148,132, languages such as Hebrew which read from right to left can readily be set up.

Preferably, instead of a single plate, the characters are provided on individual blocks which are suitably held in a case. Figure 19 shows such an element, comprising a square frame 200 of stainless steel or other suitable material in which is cemented a plate or block of glass or other transparent material bearing the desired character in either positive or negative form. Thus for example the background 201 may be black or solid while the character face 204 is transparent to permit the passage of light. The background may be formed by suitable photo-chemical means, leaving the transparent character correctly positioned. By using a steel frame the blocks may be readily handled by means of a magnet if desired.

The blocks such as that shown in Figure 19 are assembled in a case 207 as shown in Figure 20. If the object plane is not required to be adjusted vertically, as in the form of apparatus shown in Figure 7, this case will be provided with lateral projections 207a. If the case is required to be adjusted vertically, these projections are omitted as shown in Figure 3. The blocks 203 bearing the required characters are supported on a base plate 205 held in the case and are retained in position by a cover plate 206. Both the base and the cover plates may be of metal and are perforated as shown so that they constitute grids to allow of the passage of light through the character bearing blocks. Alternatively glass plates could be employed in place of these grid plates. The blocks are held in position by clamping screws 209 which engage filler strips 208 so that by loosening the screws the elements can be readily removed and exchanged as required.

Means is provided for stopping the further operation of the apparatus automatically when the film in the enclosure box has been exhausted, i. e. when insufficient film is left for the reproduction of another page of typographical matter. In Figure 21 there is shown the film enclosure box 4 positioned upon the intermediate plate 83 of the table and having its sliding lid 88. A roller $i$ is carried by a pivoted lever $j$ loaded by a spring $k$ and arranged inside the enclosure box so that it is depressed when a new roll of film, indicated at $l$, is inserted. The lever $j$ is connected to a lever $m$ outside the box which, when the lever $j$ is depressed as described, is brought into the path of a lug $n$ on a spring loaded and horizontally guided bar $o$ to which is secured a depending arm $p$. A crank $q$ is pivotally supported from the main frame 22 and carries an upstanding lug $r$, this crank being also connected to a bar $s$ which is an operating bar which, when actuated, effects the stopping of the drive of the machine as described in the specification of patent application No. 148,132. As long as the bar $o$ is held by the lever $m$ as shown in Figure 21, the arm $p$ cannot engage the lug $r$. The lever $j$ is preferably capable of adjustment to suit different sizes of film roll. The arrangement is such that as the film is unwound from the spool, the roller $i$ will rise under the action of the spring $k$ and when the film has been sufficiently unwound the lever $m$ releases the lug $n$ so that the bar $o$ is spring urged to bring the arm $p$ into the position $p^1$ shown by broken lines. The next time the table is returned to position for starting a new page this arm engages the lug $r$ on the crank $q$ and actuates this crank to displace the operating bar $s$ and thereby interrupt the drive of the machine.

It will be understood that the table will be stopped at the end of every page in the same manner as is described in the previously mentioned patent specification, which also describes a manual means for releasing the table controlling wedges. After releasing such wedges, the table can be returned to the position for starting a new page by a cable arrangement as indicated at $t$ in Figure 7. Travel of the table in line or page depth direction is effected and controlled by mechanism involving engagement of a secondary cam shaft in apparatus according to patent application No. 184,132. It follows that in order to obtain a so-called white line or spacing line, the justification frame can be operated in successive revolutions of the secondary cam shaft by means of suitably positioned double justification perforations in the perforated strip which cause engagement of the said secondary cam shaft since the trip rod of the known part of the apparatus causes actuation of the justification frame. Thus to obtain a so-called white line of say one and a half inches in depth between the end of a chapter and the heading for the next chaper, it is merely necessary for the operator to depress the justification keys a suitable number of times, the number being obtainable by dividing the required dimension by the dimension on the type body in use. Also when half lines are required, it will not be necessary to employ quads and spaces to complete the line measure as when using normal type; all that is required is the performance of the normal justification operation which enables the table to be returned to the position for starting a new line. In this way considerable time may be saved.

When using the present invention in conjunction with photogravure work or other processes of a like character, the image plane, i. e. the light-sensitive receiving surfaces may be provided with a removable screen having lines upon it forming squares, diamonds, or other patterns as may be desired, and by making the height of such screen adjustable with respect to the said surface the image division produced thereby can be varied as desired.

It will be appreciated that with apparatus according to the present invention as described above, travel of the table carrying the light receiving surface or film in the direction of line width can be readily controlled, either by hand or automatically, for each character reproduced. By such means, in the photographic reproduction of characters to a reduced size it is readily possible to increase the character width spacing and thereby enhance the readability of the reproduced matter. Also if script, music or oriental characters are reproduced, the table movement may be so adjusted that the adjacent characters are joined, and thus elaborate kerning swash and ligatures, borders, decorations and the like can be employed. Similarly in regard to table travel in the direction of line depth, the apparatus includes means which enable the table travel to be varied automatically. The table displacements may be controlled by perforated strip from a keyboard as employed in a known single-letter composing machine, such as that known under the registered trade-mark Monotype, or by a strip produced on a machine as described in patent application No. 229,341, or by other mechanism such as is described in the specification of patent application No. 229,342.

It will be understood that apparatus according to the invention is intended more particularly for use in conjunction with and as an attachment to or modification of apparatus as described in the specification of patent application No. 148,132 and that such may conveniently be employed in conjunction with controlling means as described in application No. 229,342, keyboard means as described in application No. 229,341 and character width or spacing control means as described in application No. 230,642.

The invention is not restricted to such uses, however, since the necessary movements can be effected by different means.

By the invention there is provided an apparatus whereby typographical or like matter can be reproduced on any suitable light sensitive surface to any desired character size, the size being previously set by manual means or controlled automatically as may be desired. The invention also provides means whereby the size of the reproduced characters can be varied as desired under the control of previously prepared record-bearing means or perforated strip which may be produced in a keyboard controlled mechanism.

It will be understood that whilst projection of images of different character sizes has been described hereinbefore in terms of whole lines, the table depth movement being adjusted for such increase or decrease of character size, yet it will also be appreciated that the invention is not confined to such projection but that individual characters may be of different image sizes within the same character line, as for example when initials are used for commencement of chapters and other such known uses in the art, the table movement being suitably adjusted for positioning of the large image initial in correct position, and readjustment taking place for the rest of that same line, such means having been already described.

So also can superior or inferior figures or letters be projected of a decreased size and be positioned in required relative alignment to the rest of the characters in the same line, the table movement being adjusted to ensure this desired positioning on the light sensitive surface, such special alignments for reference figures or mathematical usage or formulae being a known and frequent usage in the art.

It will be appreciated that as all table movement is relative to the centre point of the lens system, the increase or decrease in image size being equally divided either side of such central projection point and the gauge rods or point blocks being dimensioned accordingly, so by having such mechanical control over relative positions of the light sensitive surface at the same time as photographic control of the image size, it is possible to obtain any desired image size and position the image in any desired alignment relative to a line or lines.

I claim:

1. Apparatus of the kind described comprising a support for element means bearing characters to be photographically reproduced, means for supporting a light sensitive receiving surface, a light system for projecting images of the characters upon the receiving surface, power drive means operating periodically through character selection mechanism controlled by record bearing means or strip to bring said element means support, receiving surface supporting means and light system into successive positions relative to the light projection axis to project selected individual characters upon the sensitive surface for reproduction thereby in spaced and justified lines, at least two means constituting operative adjusting connections between said element means support, receiving surface supporting means and light system for effecting adjustments in the distances between them in a direction perpendicular to the plane of the receiving surface to vary the size of the focused image, periodically operated power actuating means operating in timed relation with the aforesaid character selection drive means for actuating said operative adjusting means through interposed variable motion transmitting means which is settable to vary the extent of motion transmitted thereby for focusing the image of changed size, and mechanism controlled by record bearing means or strip for initiating the operation of said operative adjusting means by said power actuating means and for selectively setting said variable motion transmitting means so as to vary the size of the focused image, said latter mechanism being operated in timed relation with the character selection operations of the apparatus so that any required change in size of the reproduced character is automatically effected before reproduction thereof.

2. Apparatus according to claim 1, in which a single record bearing means or strip controls both the character selection mechanism and the mechanism for initiating and setting the operative adjusting means for varying the size of the reproduced character.

3. Apparatus according to claim 1, in which the periodically operated power actuating means comprises a continuously reciprocable member and the variable transmitting means comprise settable members which can be selectively interposed in the path of said reciprocable member to effect different travels of the operative adjusting means for varying image size on the receiving surface, and in which the drive between the reciprocable member and the settable members is effected through a displaceable member which can be withdrawn to interrupt said drive, the positioning of said withdrawable member in drive effecting position being effected by the record bearing means controlled mechanism which also effects the required setting of the settable members.

4. Apparatus according to claim 1, in which the character bearing element means comprises a plurality of separate and separable elements, each element bearing a single character, and a frame having upper and lower plates spaced apart to receive the elements between them, at least one of said plates being removable so that the elements can be individually removed and replaced in the frame.

5. Apparatus according to claim 1, comprising a fixed framework in which a light source and focussing lens system are adjustably mounted, pivoted levers interconnecting said source and lens systems for simultaneous movement, and wedge means for controlling said pivoted levers for adjusting said source and lens system in unison towards and away from the object or image planes.

6. Apparatus according to claim 1, comprising a light source, focussing lens, a shutter for controlling the period of illumination of the light sensitive surface, a second shutter located between the light source and the character bearing element means, and means for operating said second shutter to prevent continuous illumination of said element means.

7. Apparatus according to claim 1, in which the supporting means for the receiving surface is maintained in a plane and the support for the character bearing element means is carried upon wedge means interposed between the said support and a stationary structure and constituting part of the operative adjusting connections for said character bearing means support, said wedge means being adjustable to vary the distance between the element means and the said plane.

8. Apparatus according to claim 1, in which the supporting means for the receiving surface is maintained in a horizontal plane and the support for the character bearing element means comprises a frame which is slidable horizontally in one direction in a second frame slidable horizontally in a direction at right angles to the horizontal sliding movement of the first frame, the said first frame being movable vertically in the second frame and being slidably connected to horizontal rods which are supported upon a stationary structure by interposed wedge means constituting a part of the operative adjusting connections whereby actuation of said wedge means adjusts the vertical position of said first frame.

9. Apparatus according to claim 1, in which the character bearing element means is maintained in a horizontal plane and the receiving surface supporting means comprises a table slidably supported on horizontal bars for displacement thereon, said bars being supported by crank means pivoted to a relatively stationary support and constituting a part of the operative adjusting connections and arranged so that actuation of said crank means imparts vertical displacement to the bars for effecting vertical adjustment of the table.

10. Apparatus according to claim 1, in which the character bearing element means is maintained in a horizontal plane and the receiving surface supporting means comprises a table slidably supported on bars for horizontal displacement, and wedge means interposed between the said bars and a stationary supporting structure is provided for imparting vertical movements to the bars.

11. Apparatus according to claim 1, comprising a light-excluding box containing the receiving surface, a supporting table for said box movable in line length and line depth directions, a sliding lid for said box, and means for progressively opening said sliding lid in accordance with the travel of the table in the direction of line depth.

12. Apparatus according to claim 1, comprising a light-excluding box containing the receiving surface in the form of a film carried by spools within the box, a supporting table for said box movable in line length and line depth directions, and means for automatically winding the film to expose a fresh area thereof when the table is returned to a position for starting a new page.

13. Apparatus according to claim 1, comprising a light-excluding cover for the character bearing element means and for a light-excluding box containing the receiving surface, a door in said cover for permitting insertion and removal of said box, means for locking and unlocking the door in closed position, a sliding lid on said box, and interengaging means between said locking means and said lid such that when the box is inserted within the cover the lid cannot be opened until the door has been closed and locked and the door cannot be unlocked until the lid has closed.

14. Apparatus according to claim 1, comprising a light-excluding cover for the character bearing element means and for a light-excluding box containing the receiving surface, a door in said cover for permitting insertion and removal of said box, means for locking and unlocking the door in closed position, a sliding lid on said box, interengaging means between said locking means and said lid such that when the box is inserted within the cover the lid cannot be opened until the door has been closed and the door cannot be unlocked until the lid has been closed, and means for locking the door unlocking means in door closing position, said means being only released when the box has been returned to a starting position by its supporting means.

15. Apparatus according to claim 1, comprising a focussing lens system, a light-excluding cover for the character bearing element means and for a light-excluding box containing the receiving surface, a door in said cover for permitting insertion and removal of said box, means for locking and unlocking the door in closed position, and means actuated by said unlocking means for raising the focussing lens system temporarily to prevent possible fouling of the lens by the box during withdrawal of the latter.

16. Apparatus according to claim 1, comprising a table for supporting the receiving surface, supporting means for the table including guide means arranged to permit horizontal displacement of the table in the direction of line length and also in the direction of line depth, an abutment means arranged to be interposed to control the periodic displacements of the table in line depth direction, and adjustable gauge means including gauge members of different thicknesses arranged to be interposed between the table and the said abutment means for varying the table travel in accordance with the selected gauge member interposed.

17. Apparatus according to claim 1, comprising a justification frame which is displaced for the operations of single and double justification, cancelling, image size variation and focussing, a shutter interposed in the light path for controlling the period of illumination of the light sensitive surface, a lever for operating the shutter pivotally mounted on the justification frame, and a cam rotatable from the main shaft of the machine upon an axis which is stationary relative to the justification frame, the arrangement being such that the lever will not be operated when the frame is displaced for the above mentioned operations.

18. Apparatus according to claim 1, in which the periodically operated power actuating means comprises a continuously reciprocable member and the variable transmitting means comprise rods of different dimensions mounted so that they can be individually interposed endwise between said reciprocable member and a longitudinally slidable bar forming part of the operative adjusting means for varying image size, the travel of said bar being determined in accordance with the selected rod which is interposed and the selection of said rod being determined by the mechanism controlled by record bearing means.

19. Apparatus according to claim 1, in which the periodically operated power actuating means comprises a continuously reciprocable member and the variable transmitting means comprise rods of different dimensions mounted in a hub carried by a shaft which is rotatable to interpose individual rods endwise between said reciprocable member and bars longitudinally slidable in guides and forming part of the operative adjusting means for varying image size, the travel of said bars being determined in accordance with the selected rod which is interposed and the rotation of said shaft being determined by the mechanism controlled by record bearing means.

20. Apparatus according to claim 1, comprising a focussing lens system and means for adjusting said lens system in co-ordination with the adjustment of the image or object plane, said means comprising bars slidable longitudinally in guides and constituting controlling elements periodically actuated driven means for displacing said bars through the medium of selected settable members, spring loaded wedge means for clamping said bars in adjusted position, means actuated by the said driven means for releasing the wedge means through the medium of an interposed element, and means for removing said element during setting adjustment of the bars.

21. Apparatus according to claim 1, comprising a focussing lens system and means for adjusting said lens system in co-ordination with the adjustment of the image or object plane, including a plurality of settable members selectable to determine the travel of controlling elements in accordance with the selected size of the character to be reproduced, and compressed air actuated piston means controlled from a record bearing strip for bringing the selected settable member into operative position.

22. Apparatus according to claim 1, comprising a focussing lens system and means for adjusting said lens system in co-ordination with the adjustment of the image or object plane, including a plurality of settable members selectable to determine the travel of controlling elements in accordance with the selected size of the character to be reproduced, and compressed air actuated piston means controlled from a record bearing strip for bringing the selected settable member into operative position, said piston means comprising a plurality of pistons arranged to displace a rack through different distances according to the piston which is actuated, and a pinion meshing with the rack for rotating a shaft upon which the settable members are carried.

23. Apparatus according to claim 1, comprising a focussing lens system and means for adjusting said lens system in co-ordination with the adjustment of the image or object plane, a table for supporting the receiving surface capable of controlled displacements in both line depth and line length directions, abutment means for determining the successive movements of the table in line depth direction, adjustable gauge means including gauge members of different thicknesses arranged to be interposed between the table and the said abutment means for varying the table travel, said adjustable gauge means being set to determine the desired table travel by a reciprocable member constituting the periodically operated power actuating means, said reciprocable member actuating the adjustable gauge means through one of a plurality of settable motion transmitting members, said members being selectible to determine the desired travel.

24. Apparatus according to claim 1, comprising a focussing lens system and means for adjusting said lens system in co-ordination with the adjustment of the image or object plane, a table for supporting the receiving surface capable of controlled displacements in both line depth and line length directions, variable means for controlling successive movements of the table in line depth direction, a controlling element connected to said variable means, a controlling element connected to the lens system adjusting means, settable members for determining the displacements of said controlling elements by selection of said members, and a common driven means for actuating said controlling elements through the selected members, said means comprising a lever continuously actuated from a main shaft of the apparatus, means for coupling the said lever to a slidable crosshead which when displaced is caused to engage the selected settable member and thereby effect the desired travel of the controlling elements, means for disengaging the said coupling upon the completion of the stroke of the lever after setting of the controlling elements has been effected, and means for restoring said coupling when the settable members are re-set for a different image size.

25. Apparatus according to claim 1, comprising a focussing lens system and means for adjusting said lens system in co-ordination with the adjustment of the image or object plane, a table for supporting the receiving surface capable of controlled displacements in both line depth and line length directions, abutment means for determining the successive movements of the table in line depth direction, adjustable gauge means including gauge members of different thicknesses arranged to be interposed between the table and the said abutment means for varying the table travel, said adjustable gauge means being set to determine the desired table travel by a reciprocable member constituting the periodically operated power actuating means, said reciprocable member actuating the adjustable gauge means through one of a plurality of settable motion transmitting members, said members being selectable by a mechanism comprising a plurality of compressed air pistons controlled by perforated strip means, and including a control valve arrangement for additionally controlling the air supplied to said pistons to afford the desired combinations of air supplies without the necessity of complicated combinations of perforations in the controlling strip.

26. Apparatus according to claim 1, comprising a supporting table, a light-excluding box secured to the supporting table, spools for photographic film carried in said box, means for winding one of said spools operable from outside the box, and means for automatically stopping the operation of the apparatus when insufficient film is left for reproduction of a further page of typographical matter.

27. Apparatus according to claim 1, comprising a supporting table, a light excluding box secured to the supporting table, spools for photographic film carried in said box, means for winding one of said spools operable from outside the box, and means for automatically stopping the operation of the apparatus when insufficient film is left for reproduction of a further page of typographical matter, said means comprising a spring loaded lever engaging the spool of film, said lever normally holding a spring loaded element out of the path of a pivoted lever connected to mechanism for interrupting the drive of the apparatus, the arrangement being such that when the film is exhausted the said spring loaded element is tripped and when the table is next displaced to a position for starting a new page the said element engages the pivoted lever and thereby interrupts the drive.

28. Apparatus according to claim 1, comprising a table for supporting the receiving surface and guide means permitting controlled displacements of the table in line length direction, and in which means for varying the successive table movements is actuated by the periodically operated power actuating means through a variable motion transmitting device controlled by record bearing means.

29. Apparatus according to claim 1, comprising a focussing lens system and means for adjusting said lens system in co-ordination with the adjustment of the image or object plane, a table for supporting the receiving surface and capable of controlled displacements in line length direction, variable means for controlling successive movements of the table in line length direction for varying character width as desired within the line, a controlling element operatively associated with said variable means, a controlling element connected to the lens system adjusting means, settable members for determining the displacements of said controlling elements by selection of said members, and a common driven means for actuating said controlling elements through the selected members, said means comprising a lever continuously actuated from a main shaft of the apparatus, means for coupling the said lever to a slidable crosshead which when displaced is caused to engage the selected settable member and thereby effect the desired travel of the controlling elements, means for disengaging the said coupling upon the completion of the stroke of the lever after setting of the controlling element has been effected, and means for restoring said coupling when the settable members are re-set for a different image size.

References Cited in the file of this patent

UNITED STATES PATENTS

| | | |
|---|---|---|
| 1,166,504 | Webster | Jan. 4, 1916 |
| 1,975,439 | Uher | Oct. 2, 1934 |
| 2,158,039 | Wenczler | May 9, 1939 |
| 2,160,277 | Neidich | May 30, 1939 |
| 2,227,987 | Tuttle | Jan. 7, 1941 |
| 2,229,689 | Westover | Jan. 28, 1941 |
| 2,229,690 | Westover | Jan. 28, 1941 |
| 2,231,924 | Koller | Feb. 18, 1941 |
| 2,356,620 | Schade | Aug. 22, 1944 |
| 2,388,961 | Elliott | Nov. 13, 1945 |
| 2,600,168 | Klyce | June 10, 1952 |
| 2,646,733 | Ackerman | July 28, 1953 |